United States Patent
Su et al.

(10) Patent No.: US 11,881,906 B2
(45) Date of Patent: Jan. 23, 2024

(54) APPARATUS AND METHOD FOR MEASURING NONLINEAR SIGNAL-TO-NOISE RATIO, AND TEST INSTRUMENT

(71) Applicant: FUJITSU LIMITED, Kawasaki (JP)

(72) Inventors: Xiaofei Su, Beijing (CN); Ke Zhang, Beijing (CN); Tong Ye, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/894,723

(22) Filed: Aug. 24, 2022

(65) Prior Publication Data
US 2023/0084994 A1    Mar. 16, 2023

(30) Foreign Application Priority Data
Sep. 15, 2021   (CN) .......................... 202111080988.3

(51) Int. Cl.
*H04B 17/336*    (2015.01)
*H04L 25/03*    (2006.01)

(52) U.S. Cl.
CPC ..... *H04B 17/336* (2015.01); *H04L 25/03834* (2013.01)

(58) Field of Classification Search
CPC .......................... H04B 17/336; H04L 25/03834
See application file for complete search history.

(56) References Cited

U.S. PATENT DOCUMENTS

| | | | |
|---|---|---|---|
| 7,558,479 B1* | 7/2009 | Robinson | H04B 10/2543 398/16 |
| 2014/0099127 A1* | 4/2014 | Tian | H04B 10/2507 398/152 |
| 2019/0064236 A1 | 2/2019 | Verspecht et al. | |

FOREIGN PATENT DOCUMENTS

EP    1023786 B1    6/2002

OTHER PUBLICATIONS

Random Signal Method of Nonlinear Anmplitude Distortion Measurement, IEEE Transactions on Instrumentation and Measurement, vol. IM-20, No. 2, May 1971, pp. 95-99, DOI: 10.1109/TIM.1971. 5570700; (5 pages).

(Continued)

*Primary Examiner* — Sung S Ahn
(74) *Attorney, Agent, or Firm* — STAAS & HALSEY LLP

(57) ABSTRACT

The present disclosure provides an apparatus and method for measuring a nonlinear signal-to-noise ratio, and a test instrument. The method for measuring a nonlinear signal-to-noise ratio may include performing notch operation on at least one frequency point in a spectrum of an input signal in a symbol domain or a bit domain; performing spectrum measurement on an output signal after passing through a nonlinear system; and estimating a nonlinear signal-to-noise ratio of at least one frequency point of the nonlinear system according to a spectrum of the output signal. According to the embodiments of the present disclosure, when the notch operation is performed, internal structures of symbols or bits of the input signal may be retained, and an accuracy of the measurement of the nonlinear signal-to-noise ratio may be improved.

17 Claims, 16 Drawing Sheets

(56) References Cited

OTHER PUBLICATIONS

Luis, R., Rademacher, G., Puttnam, B., et al. '1.2 Pb/s Transmission Over a 160 mm Cladding, 4-Core, 3-Mode Fiber, Using 368 C+L band PDM-256-QAM Channels', Proc. European conference on optical communication, Roma, Italy, Sep. 2018, ThSB.3; (2 pages).
Random Signal Method of Nonlinear Amplitude Distortion Measurement, IEEE Transactions on Instrumentation and Measurement, vol. IM-20, No. 2, May 1971, pp. 95-99, DOI: 10.1109/TIM.1971.5570700; (5 pages).
Nuno Borges Carvalho and José Carlos Pedro, A Novel Measurement Standard for Nonlinear In-Band Distortion Characterization Telecommunications Institute—University of Aveiro—Portugal, Downloaded on Aug. 6, 2021 at 06:30:57 UTC from IEEE Xplore. 57th ARFTG Conference Digest; (8 pages).
Pan Shenfu et al., Analysis on Influence of Frequency Domain Notch on Performance of Direct Sequence Spread Spectrum Signals, doi: 10.3969/j.issn.1003-3106.2020.04.007, 2020 Radio Engineering vol. 50 No. 4, The 54th Research Institute of CECT, China Academic Journal Electronic Publishing House; (updated 5 pages without blank page).
Schuh K, et al. 'Single Carrier 1.2 Tbit/s Transmission over 300km with PM-64 QAM at 100 GBaud', OFC, Los Angeles, USA, 2017, Th5B.5; OFC 2017 OSA 2017; (3 pages).
Luis, R., Rademacher, G., Puttnam, B., et al. '1.2 Pb/s Transmission Over a 160 mm Cladding, 4-Core, 3-Mode Fiber, Using 368 C+L band PDM-256-QAM Channels', Proc. European conference on optical communication, Roma, Italy, Sep. 2018, Th3B.3; (2 pages).
Verbist, et al. '112 Gbit/s Single-Polarization Silicon Coherent Receiver with Hybrid-Integrated BiCMOS Linear TIA', ECOC, Valencia, Spain, Sep. 2015, p. 4.15; (3 pages).
K. M. Gharaibeh, The Applicability of Noise Power Ratio (NPR) in Real Communication Signals, in 67th ARFTG Conference, San Francisco, CA, 2006, DOI: 10.1109/ARFTG.2006.4734397 (3 pages).

\* cited by examiner

APPARATUS AND METHOD FOR MEASURING NONLINEAR SIGNAL-TO-NOISE RATIO, AND TEST INSTRUMENT

CROSS-REFERENCE TO RELATED APPLICATIONS

This application claims priority under 35 USC 119 to Chinese patent application no. 202111080988.3, filed on Sep. 15, 2021, in the China National Intellectual Property Administration, the entire contents of which are incorporated herein by reference.

FIELD

The present disclosure relates to the field of communications, and particularly to an apparatus and method for measuring a nonlinear signal-to-noise ratio, and a test instrument.

BACKGROUND

The optical communication system meets the requirements of large capacity, high rate and long-distance transmission. In recent years, in the optical fiber communication industry, it begins to vigorously develop the next generation optical network with a single-carrier bit rate from 800 Gbit/s to 1 Tbit/s. The high bit rate requires both a high baud rate and a high spectrum efficiency. On the one hand, the improvement of the baud rate is one of the most challenging problems. At present, the commercial Digital-To-Analog Converter (DAC) can support a sampling rate of more than 100 GSa/s. On the other hand, the spectrum efficiency can be effectively improved with a high-order modulation format, such as a high-order Quadrature Amplitude Modulation (QAM) technology (e.g., 64-QAM, 256-QAM, etc.). In such a system with a high baud rate and a high-order modulation format, devices including a driver and a modulator require high bandwidths, and these devices usually have nonlinear noise that is non-ignorable. The nonlinear noise has a negative impact on the performance of the optical communication system.

In addition, under different baud rates, modulation formats and input power, the introduced nonlinear costs are different even for the same nonlinear device, so influences on the performance of the system are also different. Therefore, the accurate estimation of the nonlinear noise under different conditions becomes the key to improve the performance of the transmission system.

It should be noted that the above introduction to the technical background is only for the convenience of the clear and complete explanation of the technical solutions of the present disclosure and the understanding by those skilled in the art. It should not be considered that the above technical solutions are well known to those skilled in the art just because these solutions are described in the background section of the present disclosure.

SUMMARY

The inventor finds that the previous methods mainly adopt technical indicators that describe nonlinear characteristics, such as a harmonic distortion, a Total Harmonic Distortion (THD), an intermodulation distortion, an orthogonal component, a nonlinear signal-to-noise ratio, etc. However, for the THD, it is difficult to measure a harmonic distortion at a high frequency, and it is impossible to completely describe a nonlinearity. The harmonic distortion and the intermodulation distortion cannot uniquely correspond to the performance of a nonlinear system, and for example, a same Bit Error Ratio (BER) of the system may correspond to the different distribution of harmonic distortions and the different distribution of intermodulation distortions. Although the orthogonal component can accurately describe the nonlinear performance of the system, it is necessary to obtain a time domain waveform of a signal of a receiver, and a high-speed analog-to-digital converter (ADC) or digital oscilloscope should be equipped, which is costly and difficult to be realized in practical applications.

In addition, the inventor finds that the nonlinear signal-to-noise ratio can reflect the nonlinear characteristics of the system, and it is easy to be realized without requiring a high-speed ADC or digital oscilloscope. However, the existing methods to obtain the nonlinear signal-to-noise ratio are based on a simple notch operation which is performed on a waveform domain before a nonlinearity occurs. Thus, the existing notch operation will break internal structures of symbols, and the accuracy of nonlinear estimation cannot be guaranteed.

To solve the above or similar problems, the embodiments of the present disclosure provide an apparatus and method for measuring a nonlinear signal-to-noise ratio, and a test instrument.

According to a first aspect of the embodiments of the present disclosure, there is provided an apparatus for measuring a nonlinear signal-to-noise ratio, wherein the apparatus includes: a processing unit configured to perform notch operation on at least one frequency point in a spectrum of an input signal in a symbol domain or a bit domain; a measuring unit configured to perform spectrum measurement on an output signal after passing through a nonlinear system; and an estimating unit configured to estimate a nonlinear signal-to-noise ratio of at least one frequency point of the nonlinear system according to a spectrum of the output signal.

According to another aspect of the embodiments of the present disclosure, there is provided a method for measuring a nonlinear signal-to-noise ratio, wherein the method includes: performing notch operation on at least one frequency point in a spectrum of an input signal in a symbol domain or a bit domain; performing spectrum measurement on an output signal after passing through a nonlinear system; and estimating a nonlinear signal-to-noise ratio of at least one frequency point of the nonlinear system according to a spectrum of the output signal.

According to still another aspect of the embodiments of the present disclosure, there is provided a test instrument, including the apparatus for measuring a nonlinear signal-to-noise ratio provided in the first aspect of the embodiments of the present disclosure.

The embodiments of the present disclosure have the following advantageous effects: when the notch operation is performed, the internal structures of symbols or bits of the input signal are retained, and the nonlinear noise in the communication system may be accurately estimated, so that the estimation of the nonlinear noise is not affected by the pulse shaping. The embodiments of the present disclosure can be applied to different modulation formats, transmission rates and input power, and are simple, easily operable, and conveniently realizable. Moreover, the embodiments of the present disclosure can effectively detect, analyze and locate the nonlinear noise, and accurately estimate the performance of the nonlinear system.

With reference to the following descriptions and drawings, the specific implementations of the present disclosure are disclosed in detail, and the ways in which the principle of the present disclosure can be adopted are pointed out. It should be understood that the implementations of the present disclosure are not limited thereby in scope. Within the scope of the clauses of the appended claims, the implementations of the present disclosure include many changes, modifications and equivalents.

The features described and/or illustrated for one implementation may be used in one or more other implementations in a same or similar way, and combined with or substituted for features in other implementations.

It should be emphasized that the term 'comprise/include' used herein refers to the presence of features, integers, steps or components, but does not exclude the presence or addition of one or more other features, integers, steps or components.

BRIEF DESCRIPTION OF THE DRAWINGS

The elements and features described in one drawing or implementation of the embodiments of the present disclosure may be combined with the elements and features illustrated in one or more other drawings or implementations. In addition, in the drawings, similar reference numerals indicate corresponding parts in several drawings, and can be used to indicate corresponding parts used in more than one implementation.

The drawings, which are included to provide a further understanding of the embodiments of the present disclosure, constitute a part of the specification, illustrate the implementations of the present disclosure, and explain the principle of the present disclosure together with the textual description. Obviously, the drawings described below only illustrate some embodiments of the present disclosure, and those of ordinary skill in the art can obtain any other drawing from them without paying any creative labor. In the drawings.

DETAILED DESCRIPTION

Figure 1:
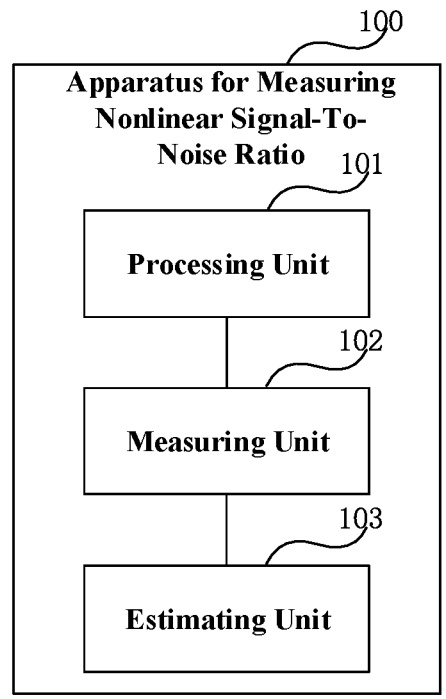
FIG. 1 is a schematic diagram of an example of an apparatus for measuring a nonlinear signal-to-noise ratio according to an embodiment of the present disclosure.

The foregoing and other features of the present disclosure will become apparent from the following description with reference to the drawings. In the description and drawings, particular embodiments of the present disclosure are specifically disclosed to represent some embodiments in which the principle of the present disclosure can be adopted. It should be understood that the present disclosure is not limited to the described embodiments, and on the contrary, the present disclosure includes all modifications, variations and equivalents that fall within the scope of the appended claims.

In the embodiments of the present disclosure, the terms 'first', 'second', etc. are used to distinguish different elements in terms of titles, but they do not mean a spatial arrangement or a time sequence of these elements, and these elements should not be limited by them. The term 'and/or' includes any one and all combinations of one or more of terms listed in association. The terms 'comprise', 'include', 'have', etc. refer to the presence of the stated features, elements, members, or components, but do not exclude the presence or addition of one or more other features, elements, members or components.

In the embodiments of the present disclosure, singular forms 'a', 'the', etc. include plural forms thereof, and should be broadly understood as 'a kind of' or 'a category of' rather than being limited to the meaning of 'one'. In addition, the term 'said' should be understood to include both singular and plural forms, unless otherwise specified in the context explicitly. In addition, the term 'according to' should be understood as 'at least partially according to . . . ' and the term 'based on' should be understood as 'at least partially based on . . . ', unless otherwise specified in the context explicitly.

In the prior art, in a digital domain, for a system with signal pulse shaping, notch operation is performed on the signal after pulse-shaping and before entering a nonlinear system, that is, the notch operation is performed on the sampled signal. Optionally, in an analog domain, notch operation is performed on an analog signal based on a band-stop filter. The resulting problem is that since the notch operation is performed on the sampled signal, it is impossible to retain internal structures of symbols of an input signal. For example, when the input signal is sampled by quadruple upsampling, one symbol corresponds to four sampling points with internal structures (mutual relationships) therebetween, and the notch operation will break the original internal structures of the four sampling points, thus making the estimation of the nonlinear signal-to-noise ratio inaccurate. For example, in a case where the notch operation is performed on a Pulse Amplitude Modulation (PAM)-8 signal shaped by Nyquist, when the roll-off factor of the shaping filter is 1, the estimated value of the nonlinear noise will be much higher than the real value.

Various implementations of the embodiments of the present disclosure will be described below with reference to the drawings. In the following description, an optical communication system is taken as an example, but the present disclosure is not limited thereto, and the method of the embodiments of the present disclosure is also applicable to other communication systems with nonlinear effects.

Embodiments of a First Aspect

The embodiments of the present disclosure provide an apparatus for measuring a nonlinear signal-to-noise ratio. The apparatus is configured in a communication system with a nonlinear effect, such as an optical communication system. In addition, the communication system may be a communication system with or without pulse shaping, a communication system with probabilistic shaping, a communication system with forward error correction coding, or a code division multiplexing system, etc., but the present disclosure is not limited thereto.

FIG. 1 is a schematic diagram of an example of an apparatus 100 for measuring a nonlinear signal-to-noise ratio according to an embodiment of the present disclosure. As illustrated in FIG. 1, the apparatus 100 includes: a processing unit 101 configured to perform notch operation on at least one frequency point in a spectrum of an input signal in a symbol domain or a bit domain; a measuring unit 102 configured to perform spectrum measurement on an output signal after passing through a nonlinear system; and an estimating unit 103 configured to estimate a nonlinear signal-to-noise ratio of at least one frequency point of the nonlinear system according to a spectrum of the output signal.

According to the embodiment of the present disclosure, by performing the notch operation on at least one frequency point in the spectrum of the input signal in the symbol domain or the bit domain, internal structures of symbols or bits of the input signal are retained when notch operation is performed, and nonlinear noise in the communication system can be accurately estimated, so that the estimation of the nonlinear noise is not affected by pulse shaping. The apparatus can be applied to different modulation formats, transmission rates and input power, and it is simple, easily operable, and conveniently realizable. Moreover, the apparatus can effectively detect, analyze and locate the nonlinear noise, and accurately estimate the performance of the nonlinear system.

In some embodiments, the estimating unit 103 may estimate the nonlinear signal-to-noise ratio at the frequency fn of the notch operation according to signal power and nonlinear noise power in the spectrum of the output signal, wherein power at both sides of the frequency fn is signal power P and power at the frequency fn is nonlinear noise power N, so that the nonlinear signal-to-noise ratio of the output signal is P/N. In some embodiments, by varying the position of the frequency fn of the notch operation, it is possible to obtain the nonlinear signal-to-noise ratios corresponding to different frequencies, so that a nonlinear signal-to-noise ratio on the whole spectrum of the output signal can be obtained, and the nonlinear noise at each frequency point on the spectrum can be accurately estimated. In some embodiments, there may be a plurality of frequencies fn, that is, the nonlinear noise on a plurality of frequency points can be measured simultaneously, thus improving the measurement accuracy and the measurement efficiency of the nonlinear signal-to-noise ratio.

In some embodiments, the input signal is an independent signal in time domain. For example, the input signal may be a bit signal or a symbol signal obtained by mapping the bit signal.

In some embodiments, for a communication system with pulse shaping, the input signal may be a uniformly distributed signal, and the input signal is a signal before upsampling, that is, the processing unit 101 performs the notch operation on the input signal in the symbol domain or the bit domain before upsampling. For example, the input signal is a signal modulated by PAM-4, PAM-8, 64-QAM, DMT (discrete multitone)-64QAM and other modulation methods.

In some embodiments, the input signal is a real signal.

Figure 2A:
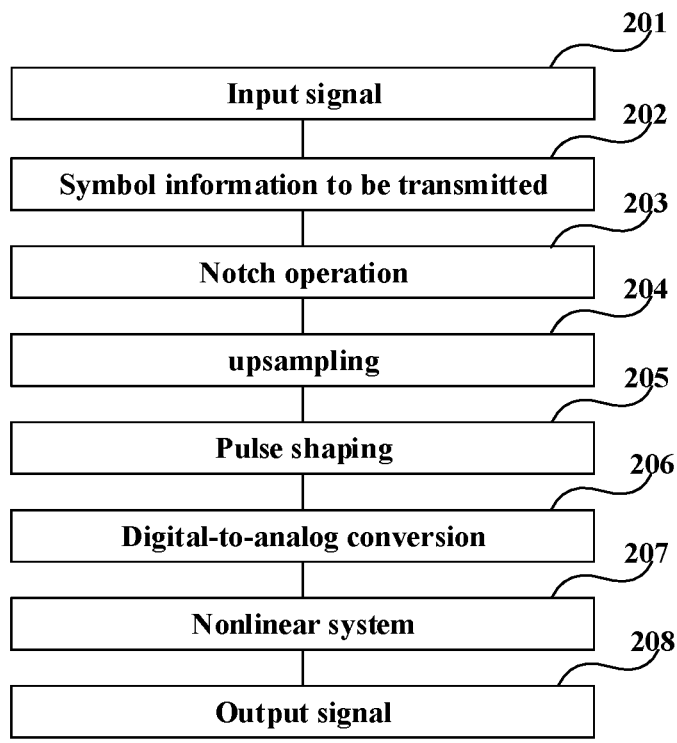
FIG. 2A is a schematic diagram of an implementation of a communication system according to an embodiment of the present disclosure.

FIG. 2A is a schematic diagram of an implementation at a position where notch operation is performed in a communication system with pulse shaping. As illustrated in FIG. 2A, in some embodiments, the processing unit 101 is configured to perform notch operation on symbol information to be transmitted before upsampling.

The communication system with pulse shaping includes a modulation module, an upsampling module, a pulse shaping module, a digital-to-analog conversion device, a nonlinear system device and an apparatus 100 for measuring a nonlinear signal-to-noise ratio according to the present disclosure.

As illustrated in FIG. 2A, after receiving an input signal (201), the communication system with pulse shaping performs modulation on the input signal by the modulation module (202). For example, the PAM-8 modulation method is adopted to load three bits of information on one symbol, wherein a baud rate of the signal modulated by PAM-8 is 42 Gbaud, thus obtaining the symbol information to be transmitted.

The modulation module sends the symbol information to be transmitted to the processing unit 101 of the apparatus 100, and then the processing unit 101 performs notch operation on the symbol information to be transmitted (203)

to obtain a signal after the notch operation. For the specific scheme of the notch operation, please refer to the later description in the present disclosure.

The processing unit 101 sends the signal after the notch operation to the upsampling module, which performs upsampling on the signal after the notch operation (204), for example by means of twice upsampling, wherein the twice sampling may adopt the prior art. For example, in a case where the highest frequency of the signal is fmax, the sampling frequency fs should meet a condition fs>=2fmax. In addition, upsampling modes with other rates such as quadruple upsampling may also be adopted, which will not be seriatim exemplified in the present disclosure.

Further, the pulse shaping module performs pulse shaping on the upsampled signal (205), wherein the pulse shaping may adopt the prior art, such as a Nyquistpulse shaping filter with a root raised cosine roll-off factor of 1. In addition, other root raised cosine roll-off factors may also be adopted, which will not be seriatim exemplified in the present disclosure.

Further, the digital-to-analog conversion device performs a digital-to-analog conversion on the pulse-shaped signal (206), and converts a discrete digital quantity into a continuously varying analog quantity; the specific scheme of digital-to-analog conversion may adopt the prior art, which will not be seriatim exemplified in the present disclosure.

Further, the digital-to-analog conversion device inputs the digital-to-analog converted signal into the nonlinear system device (207) and obtains an output signal (208). In the present disclosure, the nonlinear system device is not limited, and it may be any device with a nonlinear effect in the existing communication system, which will not be seriatim exemplified in the present disclosure.

Further, the measuring unit 102 of the apparatus 100 performs a spectrum measurement on the output signal (208). In addition, the estimating unit 103 of the apparatus 100 estimates the nonlinear signal-to-noise ratio of at least one frequency point of the nonlinear system according to the spectrum of the output signal; the method for calculating the nonlinear signal-to-noise ratio may adopt the above technical solutions of the present disclosure, which will not be seriatim exemplified in the present disclosure.

Figure 2B:
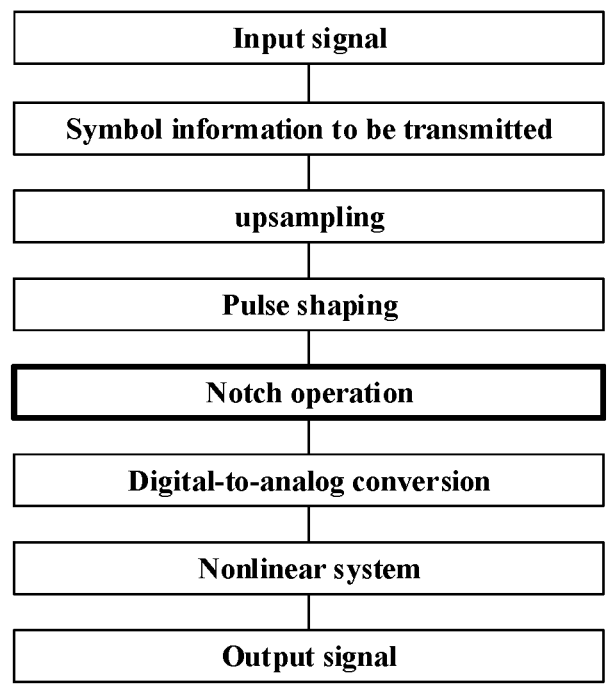
FIG. 2B is a schematic diagram of an implementation of the prior art.

FIG. 2B is a schematic diagram of notch operation on a communication system with pulse shaping in the prior art, wherein operations the same as those in the above implementation of FIG. 2A of the present disclosure will not be repeated. In the prior art, the notch operation is performed on the signal after upsampling and before entering the nonlinear system. As illustrated in FIG. 2B, a difference from the implementation of FIG. 2A is that the upsampled signal is pulse-shaped, and then the notch operation is performed on the signal after pulse-shaping. In addition, FIG. 2B only takes the notch operation performed after the pulse shaping and before the digital-to-analog conversion as an example. Optionally, in the prior art, the notch operation may also be performed after the digital-to-analog conversion, which will not be seriatim exemplified in the present disclosure. Therefore, in the prior art, the notch operation is performed on the upsampled signal, which will break the original internal structure of each sampling point, thus making the estimation of the nonlinear signal-to-noise ratio inaccurate.

Figure 3A:
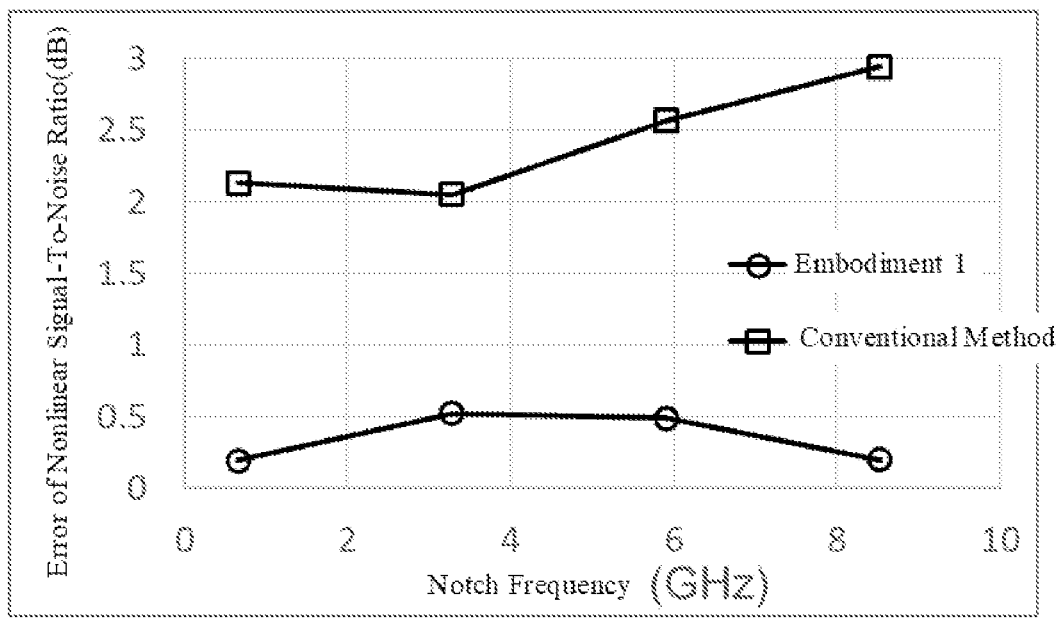
FIG. 3A is a simulation diagram of an implementation of an apparatus for measuring a nonlinear signal-to-noise ratio according to an embodiment of the present disclosure.

FIG. 3A is a simulation diagram of nonlinear signal-to-noise ratios in an implementation of the present disclosure and an implementation of the prior art, wherein the simulation adopted in FIG. 3 assumes a modulation mode of PAM-8, a baud rate of 42 Gbaud, twice upsampling, Nyquist pulse shaping, and a root raised cosine roll-off factor of 1. As can be seen from FIG. 3A, the error of the nonlinear signal-to-noise ratio estimated with the implementation of the prior art is up to 2 dB to 3 dB, but the error of the nonlinear signal-to-noise ratio estimated with the implementation of the present disclosure is less than 0.5 dB. That is, the implementation of the present disclosure estimates the nonlinear noise in the communication system more accurately.

Figure 3B:
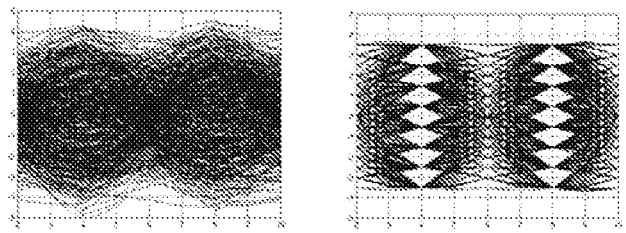
FIG. 3B is another simulation diagram of an implementation of an apparatus for measuring a nonlinear signal-to-noise ratio according to an embodiment of the present disclosure.

FIG. 3B is a schematic diagram of a comparison between an eye diagram of a signal obtained after performing notch operation and pulse shaping on an input signal by the implementation of the prior art (a left diagram of FIG. 3B) and an eye diagram of a signal obtained after performing notch operation and pulse shaping on an input signal by the implementation of the present disclosure (a right diagram of FIG. 3B), wherein the simulation assumes adopting Nyquistpulse shaping, a root raised cosine roll-off factor of 1, a modulation mode of PAM-8, and quadruple upsampling. As illustrated in FIG. 3B, the eight amplitudes in the eye diagram of the signal obtained by the implementation of the prior art are blurred and difficult to be distinguished, but the eight amplitudes in the eye diagram of the signal obtained by the implementation of the present disclosure can be clearly distinguished. That is, by performing the notch operation on at least one frequency point in the spectrum of the input signal in the symbol domain or the bit domain, the present disclosure can retain the internal structures of symbols of the input signal, so that the nonlinear noise in the communication system can be estimated more accurately.

In some embodiments, for a communication system with pulse shaping, the input signal may be a uniformly distributed signal, wherein the input signal may also be a complex signal consisting of an I-branch signal and a Q-branch signal orthogonal to each other. In some embodiments, notch operation may be performed on the I-branch signal and the Q-branch signal respectively, the complex signals obtained after the notch operation on the I-branch signal and the Q-branch signal are added and then the upsampling is performed. The present disclosure is not limited thereto, and in some embodiments, the notch operation may be directly performed on the complex signal, which will be described below separately.

Figure 4:
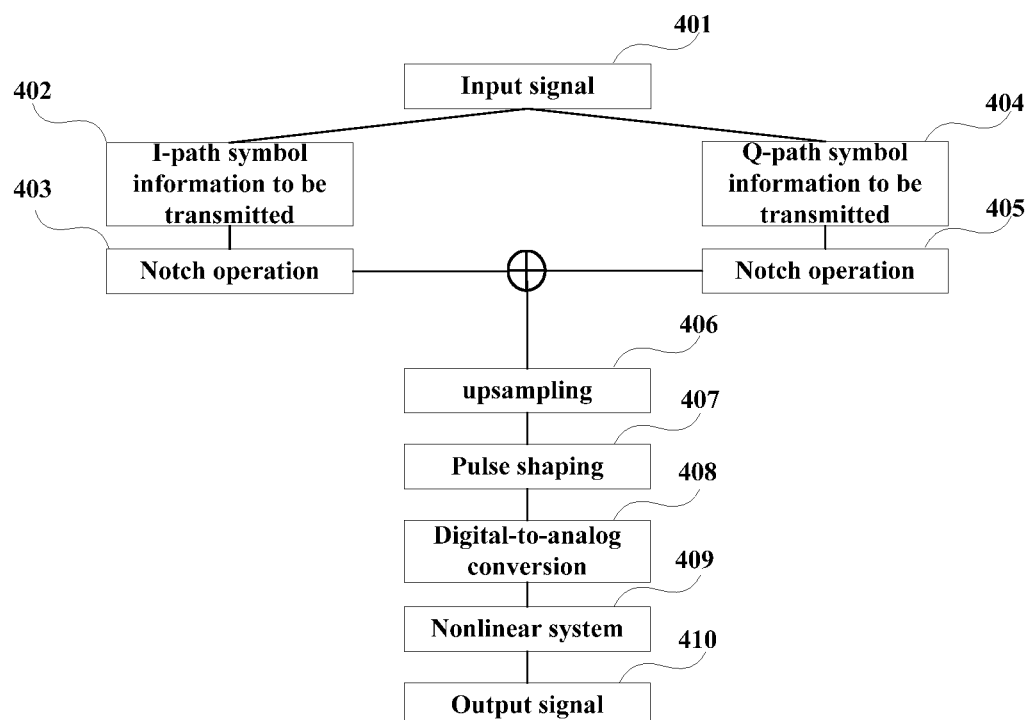
FIG. 4 is a schematic diagram of another implementation of a communication system according to an embodiment of the present disclosure.

FIG. 4 is a schematic diagram of an implementation at a position where notch operation is performed in a communication system with pulse shaping, wherein operations same as those in the above implementations of the present disclosure will not be repeated. FIG. 4 is a schematic diagram of performing notch operation on an I-branch signal and a Q-branch signal respectively. As illustrated in FIG. 4, in some embodiments, the processing unit 101 is configured to perform notch operation on I-branch symbol information to be transmitted and Q-branch symbol information to be transmitted respectively before the upsampling.

The communication system with pulse shaping includes a modulation module, an upsampling module, a pulse shaping module, a digital-to-analog conversion device, a nonlinear system device and the apparatus 100 of a nonlinear signal-to-noise ratio according to the present disclosure.

As illustrated in FIG. 4, after receiving an input signal (401), the communication system with pulse shaping performs modulation on an I-branch signal by the modulation module to obtain I-branch symbol information to be transmitted (402), and performs modulation on a Q-branch signal by the modulation module to obtain Q-branch symbol information to be transmitted (404).

The modulation module sends, the I-branch symbol information to be transmitted and the Q-branch symbol information to be transmitted, to the processing unit 101 of the apparatus 100, and then the processing unit 101 performs notch operation on the I-branch symbol information to be transmitted to obtain an I-branch signal after the notch operation (403), and performs notch operation on the Q-branch symbol information to be transmitted to obtain a Q-branch signal after the notch operation (405).

Further, the processing unit 101 sends the signal after the notch operation to the upsampling module, which performs complex signal addition on the I-branch signal after the notch operation and the Q-branch signal after the notch operation, and performs upsampling on the signal after the complex signal addition (406). Specifically, the complex signal addition may adopt the prior art. For example, the Q-branch signal is a signal obtained by superposing the I-branch signal with 90-degree phase rotation, and then the I-branch signal and the Q-branch signal are added.

Further, the pulse shaping module performs pulse shaping on the upsampled signal (407).

Further, the digital-to-analog conversion device performs digital-to-analog conversion on the pulse-shaped signal (408).

Further, the digital-to-analog conversion device inputs the digital-to-analog converted signal into the nonlinear system device (409) and obtains an output signal (410).

Further, the measuring unit 102 of the apparatus 100 performs spectrum measurement on the output signal (410); and the estimating unit 103 of the apparatus 100 estimates the nonlinear signal-to-noise ratio of at least one frequency point of the nonlinear system according to the spectrum of the output signal.

Figure 5:
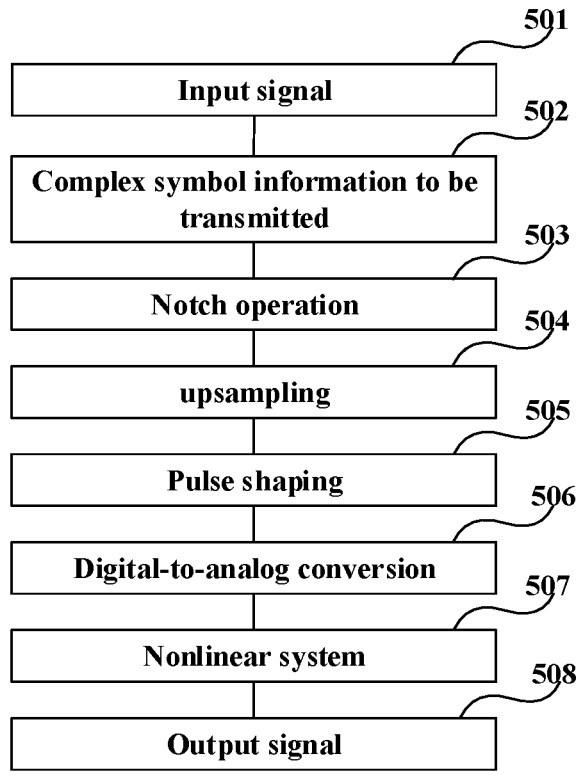
FIG. 5 is a schematic diagram of another implementation of a communication system according to an embodiment of the present disclosure.

FIG. 5 is a schematic diagram of an implementation at a position where notch operation is performed in a communication system with pulse shaping, wherein operations the same as those in the above implementations of the present disclosure will not be repeated. FIG. 5 is a schematic diagram of performing notch operation directly on a complex signal. As illustrated in FIG. 5, in some embodiments, the processing unit 101 is configured to perform notch operation on complex symbol information to be transmitted before the upsampling.

The communication system with pulse shaping includes a modulation module, an upsampling module, a pulse shaping module, a digital-to-analog conversion device, a nonlinear system device and the apparatus 100 of a nonlinear signal-to-noise ratio according to the present disclosure.

As illustrated in FIG. 5, after receiving an input signal (501), the communication system with pulse shaping performs modulation on the input signal by the modulation module to obtain complex symbol information to be transmitted (502).

The modulation module sends the complex symbol information to be transmitted to the processing unit 101 of the apparatus 100, and then the processing unit 101 performs notch operation on the complex symbol information to be transmitted to obtain a signal after the notch operation (503).

Further, the processing unit 101 sends the signal after the notch operation to the upsampling module, which performs upsampling on the signal after the notch operation (504).

Further, the pulse shaping module performs pulse shaping on the upsampled signal (505).

Further, the digital-to-analog conversion device performs digital-to-analog conversion on the pulse-shaped signal (506).

Further, the digital-to-analog conversion device inputs the digital-to-analog converted signal into the nonlinear system device (507) and obtains an output signal (508).

Further, the measuring unit 102 of the apparatus 100 performs spectrum measurement on the output signal (508); and the estimating unit 103 of the apparatus 100 estimates the nonlinear signal-to-noise ratio of at least one frequency point of the nonlinear system according to the spectrum of the output signal.

Therefore, the present disclosure can perform notch operation on at least one frequency point in the spectrum of the input signal of the complex signal in the symbol domain or the bit domain, thus retaining the internal structures of symbols of the input signal, so as to accurately estimate the nonlinear noise in the communication system.

In some embodiments, for a communication system without pulse shaping, the input signal may be a uniformly distributed signal, and the input signal is a signal before the digital-to-analog conversion, that is, the processing unit 101 performs the notch operation on the input signal in the symbol domain or the bit domain before the digital-to-analog conversion. For example, a uniformly distributed input signal is applied for a direct modulation system, and the input signal is a signal modulated by PAM-4, PAM-8, 64-QAM, DMT-64QAM and other modulation methods. In some embodiments, the notch operation is directly performed on the symbol information to be transmitted, wherein the symbol information to be transmitted may be real symbol information or complex symbol information.

Figure 6A:
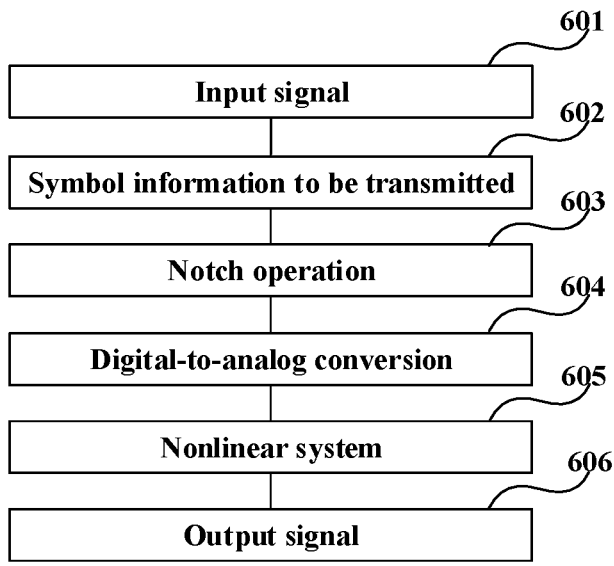
FIG. 6A is a schematic diagram of another implementation of a communication system according to an embodiment of the present disclosure.

FIG. 6A is a schematic diagram of an implementation at a position where notch operation is performed in a communication system without pulse shaping, wherein operations the same as those in the above implementations of the present disclosure will not be repeated. As illustrated in FIG. 6A, in some embodiments, the processing unit 101 is configured to perform notch operation on symbol information to be transmitted before the digital-to-analog conversion.

The communication system without pulse shaping includes a modulation module, a digital-to-analog conversion device, a nonlinear system device and the apparatus 100 of a nonlinear signal-to-noise ratio according to the present disclosure.

As illustrated in FIG. 6A, after receiving an input signal (601), the communication system without pulse shaping performs modulation on the input signal through the modulation module to obtain symbol information to be transmitted (602).

The modulation module sends the symbol information to be transmitted to the processing unit 101 of the apparatus 100, and then the processing unit 101 performs notch operation on the symbol information to be transmitted to obtain a signal after the notch operation (603).

Further, the digital-to-analog conversion device performs digital-to-analog conversion on the signal after the notch operation (604).

Further, the digital-to-analog conversion device inputs the digital-to-analog converted signal into the nonlinear system device (605) and obtains an output signal (606).

Further, the measuring unit 102 of the apparatus 100 performs spectrum measurement on the output signal (606). In addition, the estimating unit 103 of the apparatus 100 estimates the nonlinear signal-to-noise ratio of at least one frequency point of the nonlinear system according to the spectrum of the output signal.

Figure 6B:
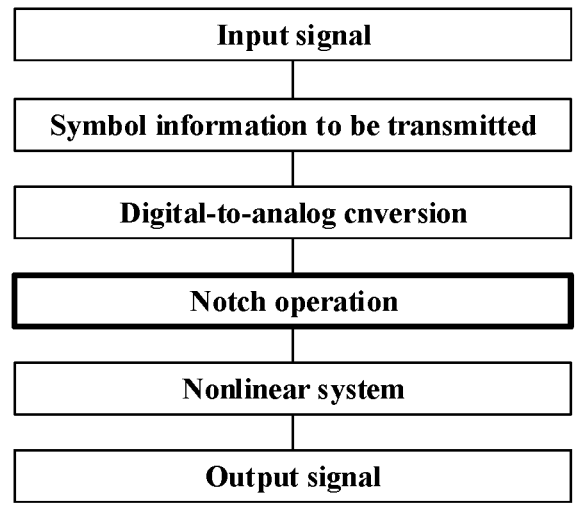
FIG. 6B is another schematic diagram of an implementation of the prior art.

FIG. 6B illustrates a process of notch operation on a communication system without pulse shaping in the prior art, wherein operations the same as those in the above implementation of FIG. 6A of the present disclosure will not be repeated. As illustrated in FIG. 6B, the difference from the implementation of FIG. 6A is that in the prior art, the notch operation is performed on the digital-to-analog converted signal. Therefore, in the prior art, the notch operation is performed on the signal in the analog domain, which will break the original internal structures of symbols or bits in the digital domain, thus making the estimation of the nonlinear signal-to-noise ratio inaccurate.

In the embodiments of the present disclosure, for the communication system without pulse shaping, the signal before digital-to-analog conversion is a symbol in the digital domain, so compared with the prior art in which the notch operation is performed after digital-to-analog conversion, the notch operation of the present disclosure still does not break the internal structures of symbols. Therefore, compared with the prior art, the present disclosure can still perform the notch operation on at least one frequency point in the spectrum of the input signal in the symbol domain or the bit domain, and retain the internal structures of symbols of the input signal, thus accurately estimating the nonlinear noise in the communication system.

In some embodiments, for a communication system with probabilistic shaping, the input signal is a signal without the probabilistic shaping or a signal after the probabilistic shaping, that is, the processing unit 101 performs notch operation on the input signal in the symbol domain or the bit domain before the upsampling. The probabilistic shaping can effectively reduce a gap between a capacity limit and a Shannon limit of a rectangular modulation format (e.g., 16-QAM, 64-QAM or 256QAM), so it has a promising application prospect. Descriptions are given below for the input signal as a signal without the probabilistic shaping and a signal after the probabilistic shaping, respectively.

Figure 7A:
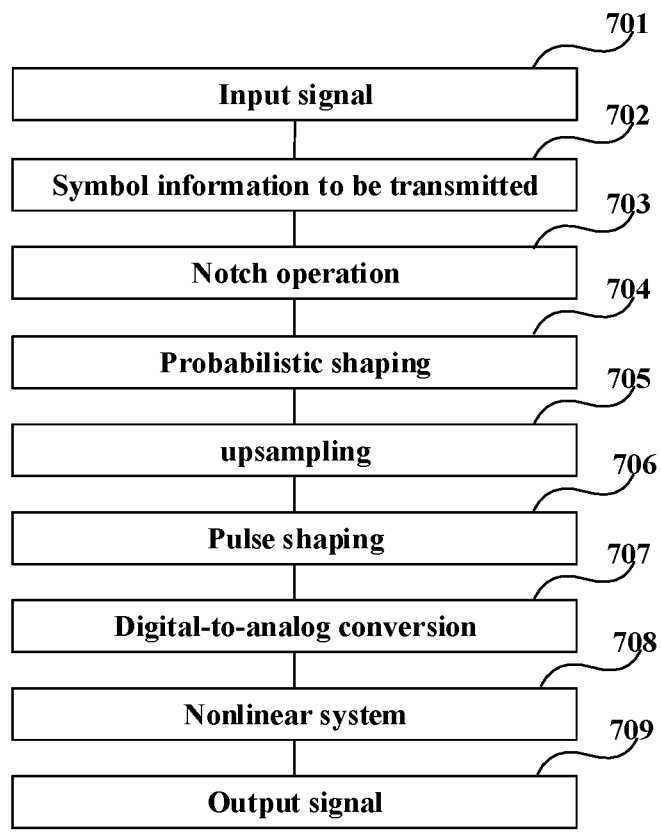
FIG. 7A is a schematic diagram of another implementation of a communication system according to an embodiment of the present disclosure.

FIG. 7A is a schematic diagram of an implementation at a position where notch operation is performed in a communication system with probabilistic shaping, wherein operations the same as those in the above implementations of the present disclosure will not be repeated. As illustrated in FIG. 7A, in some embodiments, the processing unit 101 is configured to perform notch operation on symbol information to be transmitted before the probabilistic shaping. Optionally, the processing unit 101 may be further configured to perform notch operation on bit information to be transmitted before the probabilistic shaping, which will not be seriatim exemplified in the present disclosure.

The communication system with probabilistic shaping includes a modulation module, a probabilistic shaping module, an upsampling module, a pulse shaping module, a digital-to-analog conversion device, a nonlinear system device, and the apparatus 100 of a nonlinear signal-to-noise ratio according to the present disclosure.

As illustrated in FIG. 7A, after receiving an input signal (701), the communication system with probabilistic shaping performs modulation on the input signal by the modulation module to obtain symbol information to be transmitted (702).

The modulation module sends the symbol information to be transmitted to the processing unit 101 of the apparatus 100, and then the processing unit 101 performs notch operation on the symbol information to be transmitted to obtain a signal after the notch operation (703).

The processing unit 101 sends the signal after the notch operation to the probabilistic shaping module, which performs probabilistic shaping on the signal after the notch operation (704). Optionally, in a case where the probabilistic shaping is to code bit information to be transmitted, it is unnecessary to modulate the input signal by the modulation module, and the notch operation is directly performed on the bit information to be transmitted, so that the probabilistic shaping module can perform probabilistic shaping on the signal after the notch operation.

Further, the upsampling module performs upsampling on the probabilistically shaped signal (705).

Further, the pulse shaping module performs pulse shaping on the upsampled signal (706).

Further, the digital-to-analog conversion device performs digital-to-analog conversion on the pulse-shaped signal (707).

Further, the digital-to-analog conversion device inputs the digital-to-analog converted signal into the nonlinear system device (708), and obtains an output signal (709).

Further, the measuring unit 102 of the apparatus 100 performs spectrum measurement on the output signal (709); and the estimating unit 103 of the apparatus 100 estimates the nonlinear signal-to-noise ratio of at least one frequency point of the nonlinear system according to the spectrum of the output signal.

Figure 7B:
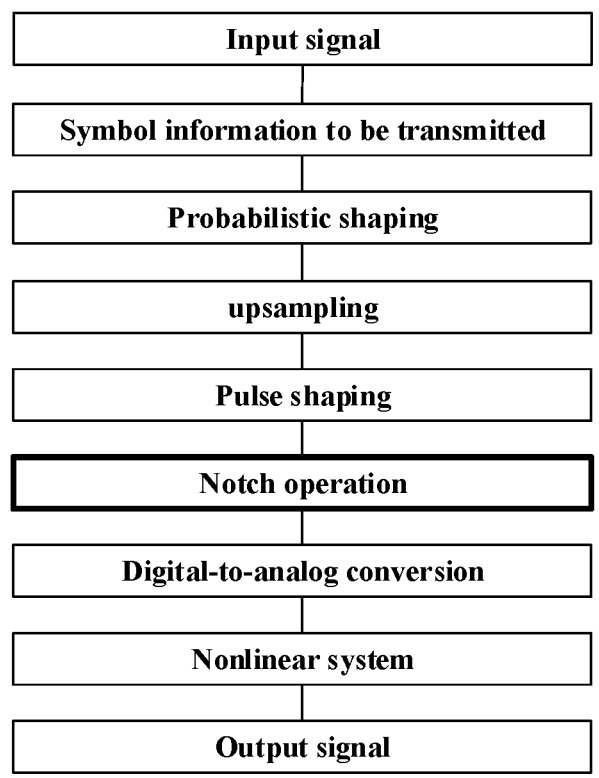
FIG. 7B is another schematic diagram of an implementation of the prior art.

FIG. 7B illustrates a process of notch operation on a communication system with probabilistic shaping in the prior art, wherein operations the same as those in the above implementation of FIG. 7A of the present disclosure will not be repeated. FIG. 7B is a schematic diagram of performing notch operation in a digital domain in the prior art. As illustrated in FIG. 7B, the difference from the implementation of FIG. 7A is that in the prior art, the notch operation is performed on the signal after probabilistic shaping, the upsampling and the pulse shaping. Therefore, in the prior art, the notch operation is performed on the upsampled signal for the communication system with probabilistic shaping, which will break the original internal structure of each sampling point, thus making the estimation of nonlinear signal-to-noise ratio inaccurate.

Figure 8A:
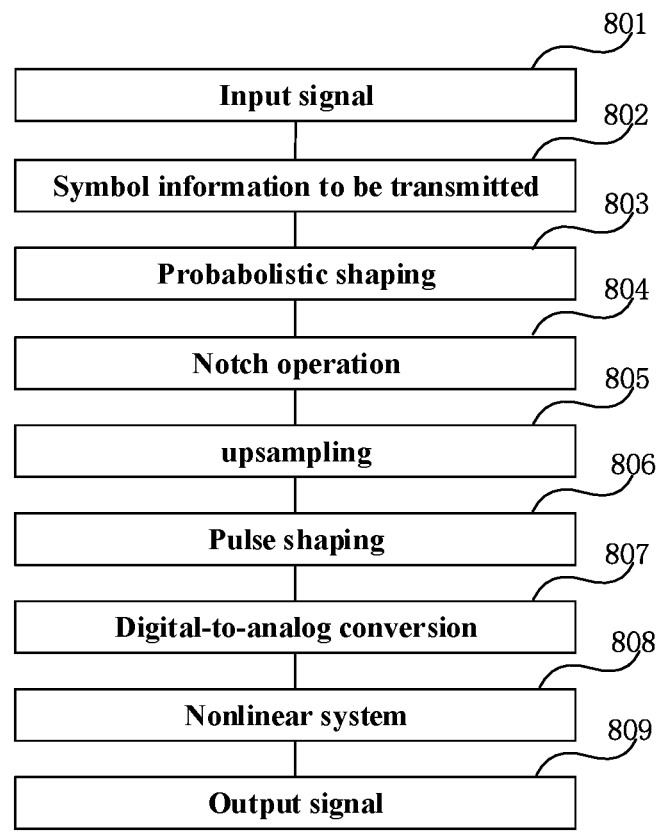
FIG. 8A is a schematic diagram of another implementation of a communication system according to an embodiment of the present disclosure.

FIG. 8A is a schematic diagram of an implementation at a position where notch operation is performed in a communication system with probabilistic shaping, wherein operations the same as those in the above implementations of the present disclosure will not be repeated. As illustrated in FIG. 8A, in some embodiments, the processing unit 101 is configured to perform notch operation on symbol information to be transmitted after the probabilistic shaping and before the upsampling. Optionally, the processing unit 101 may be further configured to perform notch operation on bit information to be transmitted after the probabilistic shaping and before the upsampling, which will not be seriatim exemplified in the present disclosure.

The communication system with probabilistic shaping includes a modulation module, a probabilistic shaping module, an upsampling module, a pulse shaping module, a digital-to-analog conversion device, a nonlinear system device, and the apparatus 100 of a nonlinear signal-to-noise ratio according to the present disclosure.

As illustrated in FIG. 8A, after receiving an input signal (801), the communication system with probabilistic shaping performs modulation on the input signal by the modulation module to obtain symbol information to be transmitted (802).

The probabilistic shaping module performs probabilistic shaping on the symbol information to be transmitted (803).

The probabilistic shaping module sends the probabilistically shaped signal to the processing unit 101 of the apparatus 100, and then the processing unit 101 performs notch operation on the probabilistically shaped signal to obtain a signal after the notch operation (804). Optionally, in a case where the probabilistic shaping module is to perform encoding on the bit information to be transmitted, it is unnecessary to modulate the input signal by the modulation module, and the probabilistic shaping is directly performed on the bit information to be transmitted, then notch operation is performed on the probabilistically shaped signal.

Further, the upsampling module performs upsampling on the signal after the notch operation (805).

Further, the pulse shaping module performs pulse shaping on the upsampled signal (806).

Further, the digital-to-analog conversion device performs digital-to-analog conversion on the pulse-shaped signal (807).

Further, the apparatus 100 inputs the digital-to-analog converted signal into the nonlinear system (808);

Further, the digital-to-analog conversion device inputs the digital-to-analog converted signal into the nonlinear system device (808), and obtains an output signal (809);

Further, the measuring unit 102 of the apparatus 100 performs spectrum measurement on the output signal (809); and the estimating unit 103 of the apparatus 100 estimates the nonlinear signal-to-noise ratio of at least one frequency point of the nonlinear system according to the spectrum of the output signal.

Figure 8B:
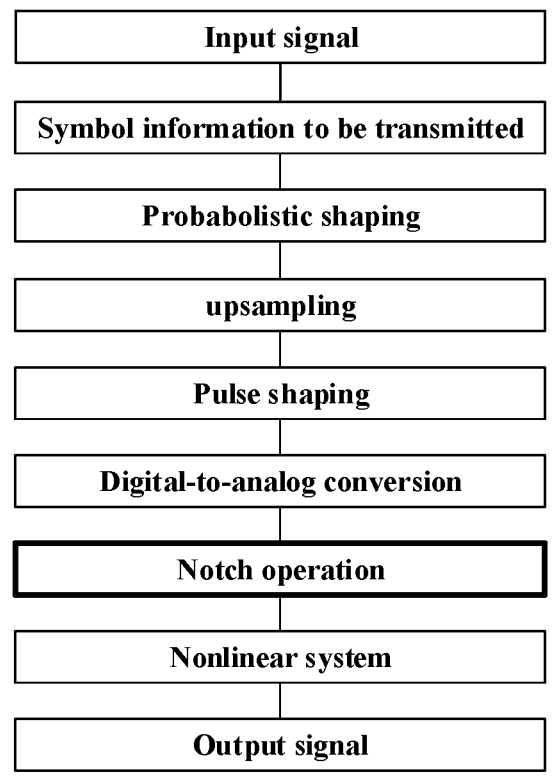
FIG. 8B is another schematic diagram of an implementation of the prior art.

FIG. 8B illustrates a process of notch operation on a communication system with probabilistic shaping in the prior art, wherein operations the same as those in the above implementation of FIG. 8A of the present disclosure will not be repeated. FIG. 8B is a schematic diagram of performing notch operation in an analog domain in the prior art. As illustrated in FIG. 8B, the difference from the implementation of FIG. 8A is that in the prior art, the notch operation is performed on the signal after the probabilistic shaping, the upsampling, the pulse shaping and the digital-to-analog conversion. Therefore, in the prior art, the notch operation is performed on the upsampled and digital-to-analog converted signal for the communication system with probabilistic shaping, which will break the original internal structure of each sampling point, thus making the estimation of nonlinear signal-to-noise ratio inaccurate.

In the embodiments of the present disclosure, the signals before and after the probabilistic shaping are all bits or symbols, that is, one bit or one symbol corresponds to one sampling point, so compared with the prior art, the notch operation should be performed after the sampling, and the notch operation of the present disclosure still does not break the internal structures of symbols. Therefore, compared with the prior art, the present disclosure can still perform notch operation on at least one frequency point in the spectrum of the input signal in the symbol domain or the bit domain, and retain the internal structures of symbols of the input signal, thus accurately estimating the nonlinear noise in the communication system.

In some embodiments, for a communication system with forward error correction (FEC) coding, the input signal is a signal without forward error correction or a signal after forward error correction, that is, the processing unit 101 performs notch operation on the input signal in the symbol domain or the bit domain before the upsampling. The forward error correction coding can effectively reduce a bit error rate of the communication system, and it has been widely used in practical systems. Descriptions are given below for the input signal as a signal without the forward error correction and a signal after the forward error correction, respectively.

Figure 9A:
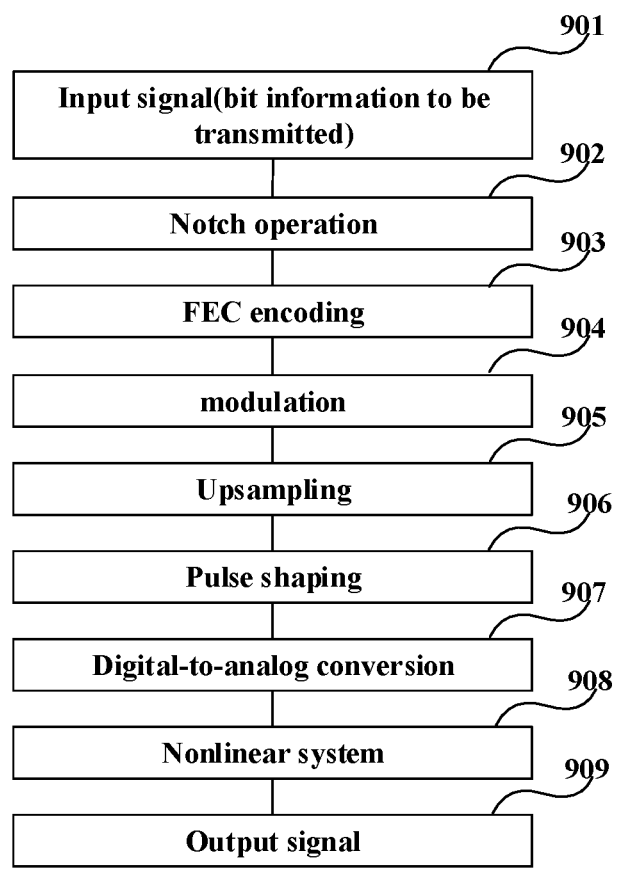
FIG. 9A is a schematic diagram of another implementation of a communication system according to an embodiment of the present disclosure.

FIG. 9A is a schematic diagram of an implementation at a position where notch operation is performed in a communication system with FEC encoding, wherein operations the same as those in the above implementations of the present disclosure will not be repeated. As illustrated in FIG. 9A, in some embodiments, the processing unit 101 is configured to perform notch operation on bit information to be transmitted before the FEC encoding. Optionally, the processing unit 101 may be further configured to perform notch operation on symbol information to be transmitted before the FEC encoding, which will not be seriatim exemplified in the present disclosure.

The communication system with FEC encoding includes a modulation module, an FEC encoding module, an upsampling module, a pulse shaping module, a digital-to-analog conversion device, a nonlinear system device, and the apparatus 100 for measuring a nonlinear signal-to-noise ratio according to the present disclosure.

As illustrated in FIG. 9A, after receiving an input signal (901), the communication system with the FEC encoding obtains the bit information to be transmitted.

Next, the processing unit 101 performs notch operation on the bit information to be transmitted to obtain a signal after the notch operation (902).

The processing unit 101 sends the signal after the notch operation to the FEC encoding module, which performs FEC encoding on the signal after the notch operation (903).

Further, the modulation module performs modulation on the FEC-coded bit information to obtain symbol information (904).

Further, the upsampling module performs upsampling on the symbol information (905).

Further, the pulse shaping module performs pulse shaping on the upsampled signal (906).

Further, the digital-to-analog conversion device performs digital-to-analog conversion on the pulse-shaped signal (907).

Further, the digital-to-analog conversion device inputs the digital-to-analog converted signal into the nonlinear system device (908) and obtains an output signal (909).

Further, the measuring unit 102 of the apparatus 100 performs spectrum measurement on the output signal (909); and the estimating unit 103 of the apparatus 100 estimates the nonlinear signal-to-noise ratio of at least one frequency point of the nonlinear system according to the spectrum of the output signal.

Optionally, in a case where the FEC encoding is performed on a symbol to be transmitted, firstly the modulation module needs to perform a modulation to obtain the symbol information to be transmitted, and then notch operation is performed on the symbol information to be transmitted; next, the FEC encoding module performs FEC encoding on a signal after the notch operation, and the upsampling module performs upsampling on the FEC-coded symbol. The subsequent procedure is similar to that in FIG. 9A, which will not be repeated here.

Figure 9B:
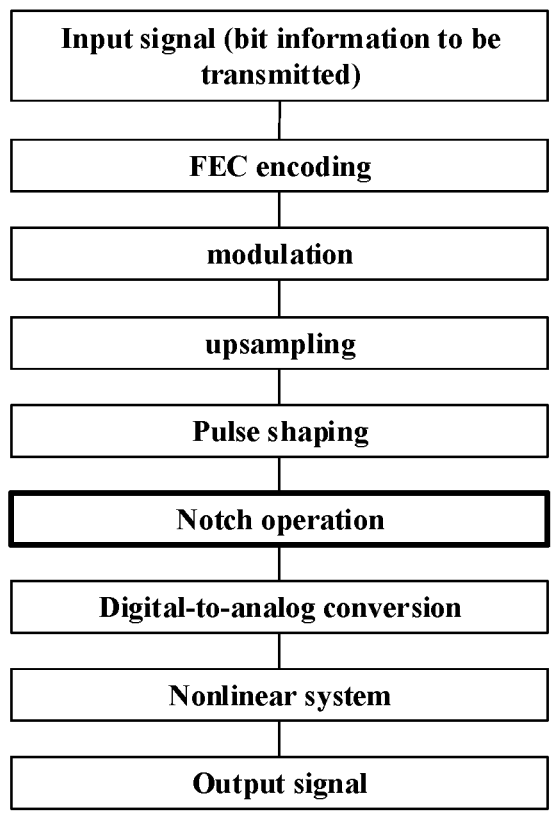
FIG. 9B is another schematic diagram of an implementation of the prior art.

FIG. 9B illustrates a process of notch operation on a communication system with FEC encoding in the prior art, wherein operations the same as those in the above implementation of FIG. 9A of the present disclosure will not be repeated. FIG. 9B is a schematic diagram of performing notch operation in a digital domain in the prior art. As illustrated in FIG. 9B, the difference from the implementation of FIG. 9A is that in the prior art, the notch operation is performed on the signal after the FEC encoding, the modulation, the upsampling and the pulse shaping. Therefore, in the prior art, the notch operation is performed on the upsampled signal for the communication system with FEC encoding, which will break the original internal structure of each sampling point, thus making the estimation of nonlinear signal-to-noise ratio inaccurate.

Figure 10A:
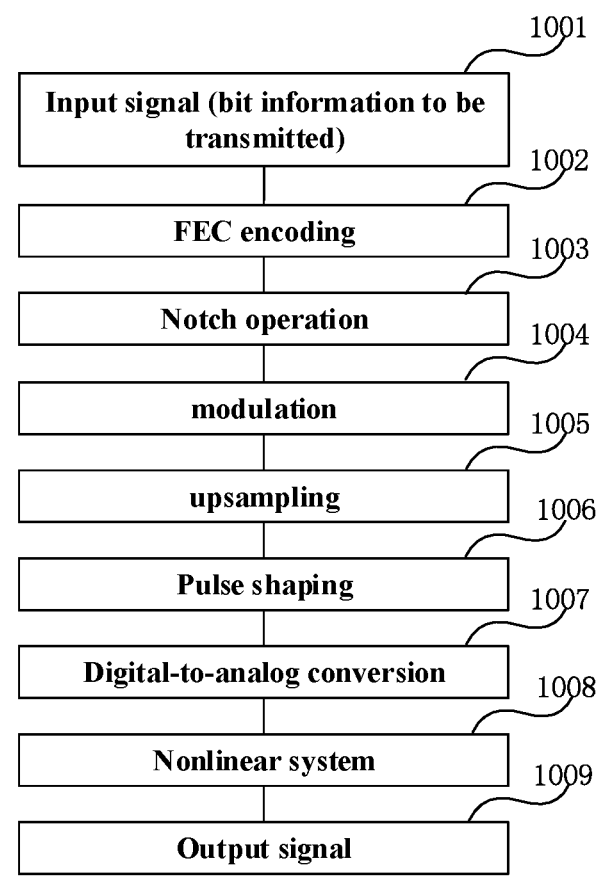
FIG. 10A is a schematic diagram of another implementation of a communication system according to an embodiment of the present disclosure.

FIG. 10A is a schematic diagram of an implementation at a position where notch operation is performed in a communication system with FEC encoding, wherein operations the same as those in the above implementations of the present disclosure will not be repeated. As illustrated in FIG. 10A, in some embodiments, the processing unit 101 is configured to perform notch operation on bit information to be transmitted after the FEC encoding and before the upsampling. Optionally, the processing unit 101 may be further configured to perform notch operation on symbol information to be transmitted after the FEC encoding and before the upsampling, which will not be seriatim exemplified in the present disclosure.

The communication system with FEC encoding includes a modulation module, an FEC encoding module, an upsampling module, a pulse shaping module, a digital-to-analog conversion device, a nonlinear system device, and the apparatus 100 for measuring a nonlinear signal-to-noise ratio according to the present disclosure.

As illustrated in FIG. 10A, after receiving an input signal (1001), the communication system with the FEC encoding obtains the bit information to be transmitted.

The FEC encoding module performs FEC encoding on the bit information to be transmitted (1002).

The FEC encoding module sends the FEC-coded signal to the processing unit 101 of the apparatus 100, and then the processing unit 101 performs notch operation on the FEC-coded signal to obtain a signal after the notch operation (1003).

Further, the modulation module performs modulation on the bit information after the notch operation to obtain symbol information (1004).

Further, the upsampling module performs upsampling on the symbol information (1005).

Further, the pulse shaping module performs pulse shaping on the upsampled signal (1006).

Further, the digital-to-analog conversion device performs digital-to-analog conversion on the pulse-shaped signal (1007).

Further, the digital-to-analog conversion device inputs the digital-to-analog converted signal into the nonlinear system device (1008) and obtains an output signal (1009).

Further, the measuring unit 102 of the apparatus 100 performs spectrum measurement on the output signal (1009); and the estimating unit 103 of the apparatus 100 estimates the nonlinear signal-to-noise ratio of at least one frequency point of the nonlinear system according to the spectrum of the output signal.

Optionally, in a case where the FEC encoding is performed on symbol information to be transmitted, firstly the modulation module needs to perform a modulation to obtain the symbol information to be transmitted, and then the FEC encoding module performs FEC encoding on the symbol information to be transmitted; next, notch operation is performed on the FEC-coded signal, and then the signal after the notch operation is upsampled. The subsequent procedure is similar to that in FIG. 10A, which will not be repeated here.

Figure 10B:
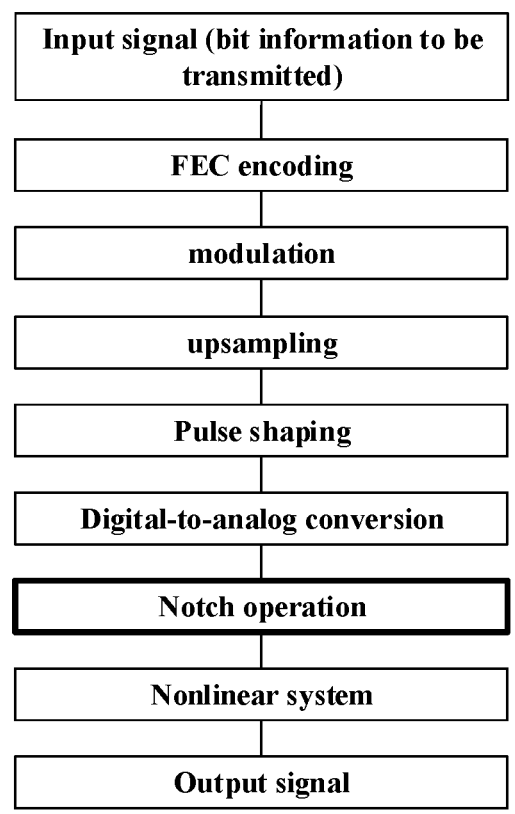
FIG. 10B is another schematic diagram of an implementation of the prior art.

FIG. 10B illustrates a process of notch operation on a communication system with FEC encoding in the prior art, wherein operations the same as those in the above implementation of FIG. 10A of the present disclosure will not be repeated. FIG. 10B is a schematic diagram of performing notch operation in an analog domain in the prior art. As illustrated in FIG. 10B, the difference from the implementation of FIG. 10A is that in the prior art, the notch operation is performed on the signal after the FEC encoding, the modulation, the upsampling, the pulse shaping and the digital-to-analog conversion. Therefore, in the prior art, the notch operation is performed on the upsampled and digital-to-analog converted signal for the communication system with FEC encoding, which will break the original internal structure of each sampling point, thus making the estimation of nonlinear signal-to-noise ratio inaccurate.

In the embodiments of the present disclosure, since the FEC encoding mainly codes the bit information, the coding will be completed before the upsampling and the pulse shaping even if the symbol information is coded. Therefore, whether the notch operation is performed before or after the FEC encoding, and whether the object of the notch operation is the bit information or the symbol information, the notch operation will not change the internal structures of bits or symbols. Therefore, compared with the prior art, which requires to perform the notch operation after the sampling, the notch operation in the present disclosure still does not break the internal structures of bits or symbols. Therefore, compared with the prior art, the present disclosure can still perform the notch operation on at least one frequency point in the spectrum of the input signal in the symbol domain or the bit domain, and retain the internal structures of symbols of the input signal, thus accurately estimating the nonlinear noise in the communication system.

In some embodiments, for a code division multiplexing (CDM) communication system, the input signal is a signal without spread spectrum modulation, that is, the processing unit 101 performs the notch operation on the input signal in the symbol domain or the bit domain before the spread spectrum modulation. The code division multiplexing (CDM) technology can realize that the signals transmitted by respective users in the communication system share the whole bandwidth, and it has been widely used in WLAN.

Figure 11A:
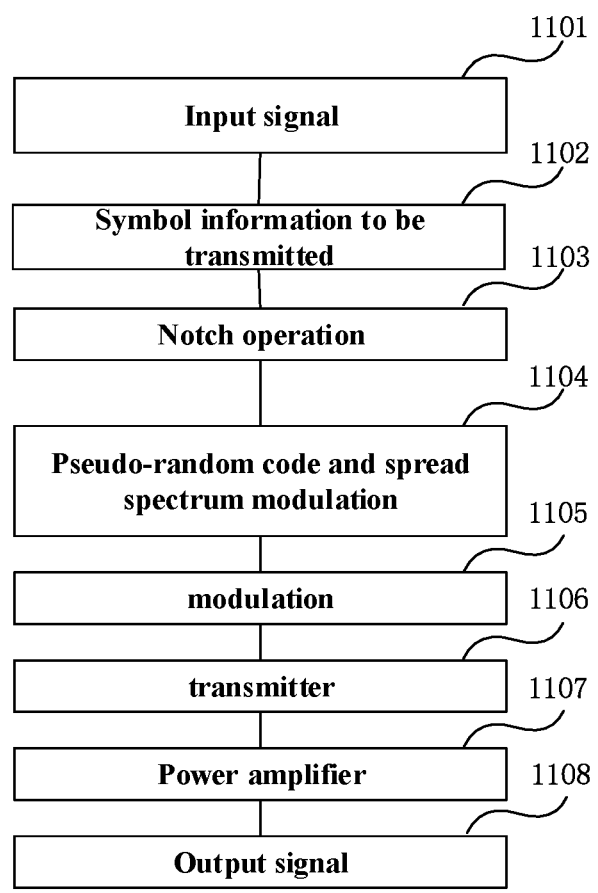
FIG. 11A is a schematic diagram of another implementation of a communication system according to an embodiment of the present disclosure.

FIG. 11A is a schematic diagram of an implementation at a position where notch operation is performed in a code division multiplexing (CDM) communication system, wherein operations the same as those in the above implementations of the present disclosure will not be repeated. As illustrated in FIG. 11A, in some embodiments, the processing unit 101 is configured to perform notch operation on symbol information to be transmitted before spread spectrum modulation.

The code division multiplexing (CDM) communication system includes a spread spectrum module, a modulation module, a transmitter 1106, a power amplifier 1107, and the apparatus 100 for measuring a nonlinear signal-to-noise ratio according to the present disclosure.

As illustrated in FIG. 11A, after receiving an input signal (1101), the code division multiplexing (CDM) communication system obtains symbol information to be transmitted (1102).

The symbol information to be transmitted of the input signal is sent to the processing unit 101 of the apparatus 100, and then the processing unit 101 performs notch operation on the symbol information to be transmitted to obtain a signal after the notch operation (1103).

Further, the spread spectrum module performs spread spectrum modulation on the signal after the notch operation through pseudo-random codes (1104).

Further, the modulation module performs modulation on the spread spectrum modulated signal (1105).

Further, the modulation module inputs the modulated signal into the transmitter 1106.

Further, the transmitter 1106 performs power amplification on the signal output from the transmitter by the power amplifier 1107 to obtain an output signal (1108), wherein the power amplifier 1107 is a nonlinear system device with a nonlinear effect.

Further, the measuring unit 102 of the apparatus 100 performs spectrum measurement on the output signal (1108); and the estimating unit 103 of the apparatus 100 estimates the nonlinear signal-to-noise ratio of at least one frequency point of the nonlinear system according to the spectrum of the output signal.

Figure 11B:
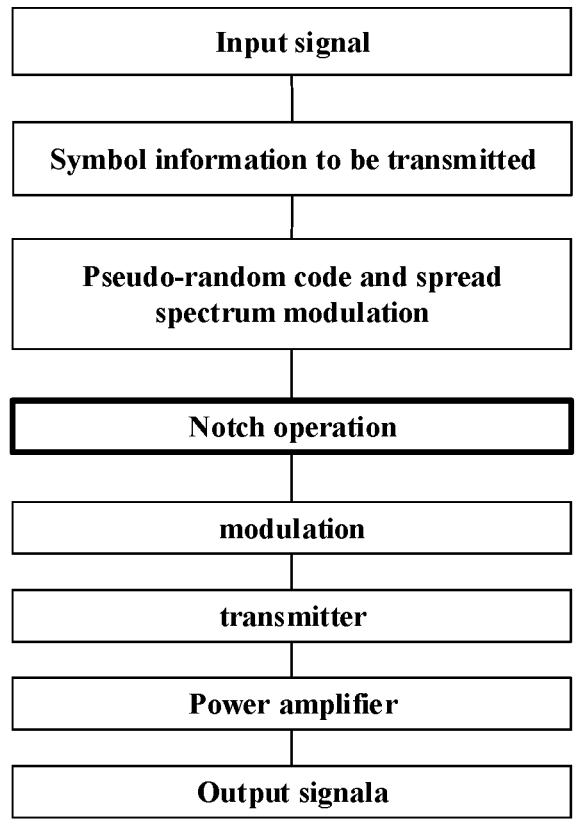
FIG. 11B is another schematic diagram of an implementation of the prior art.

FIG. 11B illustrates a process of notch operation on a code division multiplexing (CDM) communication system in the prior art, wherein operations the same as those in the above implementation of FIG. 11A of the present disclosure will not be repeated. As illustrated in FIG. 11B, the difference from the implementation of FIG. 11A is that in the prior art, the notch operation is performed on the spread spectrum modulated signal. Therefore, in the prior art, the notch operation is performed on the code division multiplexed signal for the code division multiplexing (CDM) communication system, which will break the original internal structures of symbol, thus making the estimation of nonlinear signal-to-noise ratio inaccurate.

In the embodiments of the present disclosure, in the code division multiplexing (CDM) system, the notch operation is performed before the code division multiplexing (coder), so compared with the prior art which requires to perform the notch operation after the code division multiplexing (CDM), the notch operation of the present disclosure will not break the internal structures of symbols. Therefore, the present disclosure can still perform the notch operation on at least one frequency point in the spectrum of the input signal in the symbol domain or the bit domain, and retain the internal structures of symbols of the input signal, thus accurately estimating the nonlinear noise in the communication system.

In some embodiments, the notch operation includes a frequency-domain power reduction method, a time-domain convolutional band-stop filter method and an isospectral isoprobabilistic notch operation method. However, the present disclosure is not limited thereto, and any other implementable notch operation method may also be applied in the present disclosure.

In some embodiments, when the notch operation is performed by using the frequency-domain power reduction method: firstly performing fast Fourier transform (FFT) on the input signal to transform the input signal to frequency domain, then multiplying a frequency domain transformed signal by a band-stop filter, and performing inverse fast Fourier transform (IFFT) on a signal output from the band-stop filter to transform the output signal to time domain, so as to obtain a signal after the notch operation. The processes of the fast Fourier transform (FFT) and the inverse fast Fourier transform (IFFT) may adopt the existing technical solutions, which are not limited in the present disclosure. In addition, the band-stop filter refers to a filter that can pass most frequency components, but attenuate the signals of some frequency components to a very low level.

Figure 12:
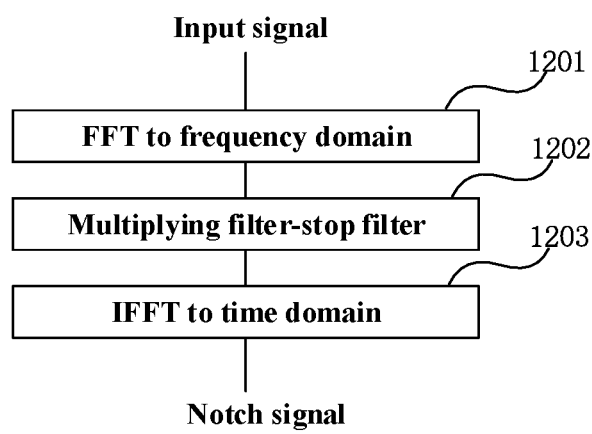
FIG. 12 is a schematic diagram of an implementation of notch operation according to an embodiment of the present disclosure.

FIG. 12 is a schematic diagram of an implementation of the processing unit 101. FIG. 12 is a schematic diagram of performing the notch operation by the processing unit 101 by using the frequency-domain power reduction method. As illustrated in FIG. 12, in some embodiments, the processing unit 101 is configured to:

perform fast Fourier transform (FFT) on the input signal to obtain a signal in frequency domain (1201);

multiply the signal in frequency domain by a band-stop filter (1202); and perform inverse fast Fourier transform (IFFT) on the signal output from the band-stop filter to obtain a signal after the notch operation in time domain (1203).

In some embodiments, when the notch operation is performed by using the time domain convolution band-stop filter method, the input signal is input into a convolution band-stop filter to obtain the signal after the notch operation. The convolution band-stop filter can directly obtain the signal after the notch operation by enabling the signal in time domain to pass through the convolution band-stop filter.

Figure 13:
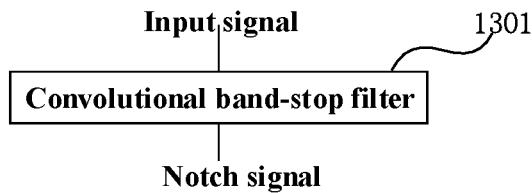
FIG. 13 is a schematic diagram of another implementation of notch operation according to an embodiment of the present disclosure.

FIG. 13 is a schematic diagram of an implementation of the processing unit 101. FIG. 13 is a schematic diagram of performing the notch operation by the processing unit 101 by using the time domain convolution band-stop filter method. As illustrated in FIG. 13, in some embodiments, the processing unit 101 is configured to pass the input signal through a convolution band-stop filter, and obtain a signal after the notch operation in time domain (1301).

In some embodiments, the isospectral isoprobabilistic notch operation method includes: performing isoprobabilistic processing, perturbation processing (optional) and isospectral processing cyclically on the input signal by taking a reference signal as a standard, until an obtained signal meets requirements on a target probability distribution and a target spectrum at the same time, so as to obtain a signal after the notch operation. A probability distribution of the reference signal meets the requirement on the target probability distribution; the isoprobabilistic processing refers to processing that makes a probability density distribution of the output signal identical to that of the reference signal; the perturbation processing refers to processing that makes a structure of a spectrum of the input signal randomly changed within a resolution bandwidth; and the isospectral processing refers to processing that makes a power distribution of the spectrum of the output signal close to a requirement on a power distribution of the target spectrum.

Figure 14:
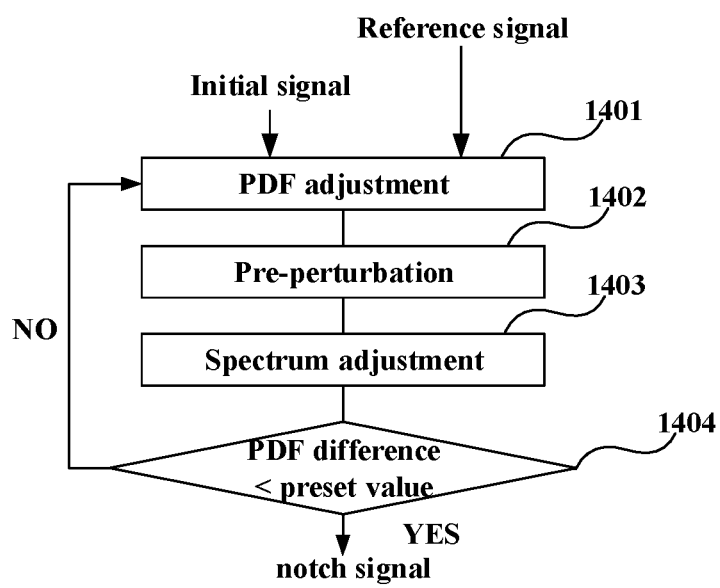
FIG. 14 is a schematic diagram of another implementation of notch operation according to an embodiment of the present disclosure.

FIG. 14 is a schematic diagram of an implementation of the processing unit 101. FIG. 14 is a schematic diagram of performing the notch operation by the processing unit 101 by using the isospectral isoprobabilistic notch operation method. As illustrated in FIG. 14, in some embodiments, the processing unit 101 is configured to:

perform a probability density function (PDF) adjustment of an input initial signal by taking a reference signal as a standard (1401), so that the output signal and the reference signal have identical PDFs, wherein the reference signal may the input signal plus noise, such as a mapped symbol signal before the notch operation plus noise; and the initial signal may be a random signal that may have a standard Gaussian distribution;

perform perturbation processing on the PDF-adjusted signal in frequency domain (1402), wherein the existing technical solution such as pre-perturbation may be adopted for the perturbation processing, which is not limited in the present disclosure;

adjust a spectrum of the perturbed signal by taking a spectrum of the reference signal (1403) as a standard, so that the adjusted signal and the reference signal have identical frequency spectra;

confirm whether a PDF difference between the input signal and the reference signal is less than a preset value (1404); if so, perform notch operation on the output signal, that is, reduce the power of one or more specific frequency points to obtain the signal after the notch operation; and if not, repeatedly iterate steps 1401 to 1403 until the PDF difference is less than the preset value, and then output the signal after the notch operation.

Therefore, the output signal after the notch operation has a spectrum and a PDF similar to those of the input signal, thus reducing a frequency offset or a power offset between the output signal and the input signal during the notch operation, and further improving the accuracy of the nonlinear noise estimation.

It should be noted that FIGS. 1 to 14 just schematically illustrate the embodiments of the present disclosure, and the present disclosure is not limited thereto. For example, the respective components may be adjusted appropriately, some other components may be added or some components may be reduced. Those skilled in the art can make appropriate modifications according to the above content, without being limited to the illustrations of FIGS. 1 to 14.

Those described above are just examples of the embodiments of the present disclosure, and the present disclosure is not limited thereto. Appropriate modifications may be made based on the above embodiments. For example, the above embodiments may be adopted separately, or one or more of them may be combined.

With the apparatus of this embodiment, when the notch operation is performed, the internal structures of symbols or bits of the input signal are retained, and the nonlinear noise in the communication system can be accurately estimated, so that the estimation of the nonlinear noise is not affected by the pulse shaping. The apparatus can be applied to different modulation formats, transmission rates and input power, and it is simple, easily operable, and conveniently realizable. Moreover, the apparatus can effectively detect, analyze and locate the nonlinear noise, and accurately estimate the performance of the nonlinear system.

Embodiments of a Second Aspect

The embodiments of the present disclosure provide a method for measuring a nonlinear signal-to-noise ratio. Since the principle of this method for solving problems is similar to that of the apparatus according to the embodiments of the first aspect, its specific implementations may refer to those of the apparatus according to the embodiments of the first aspect, and the same content will not be repeated.

Figure 15:
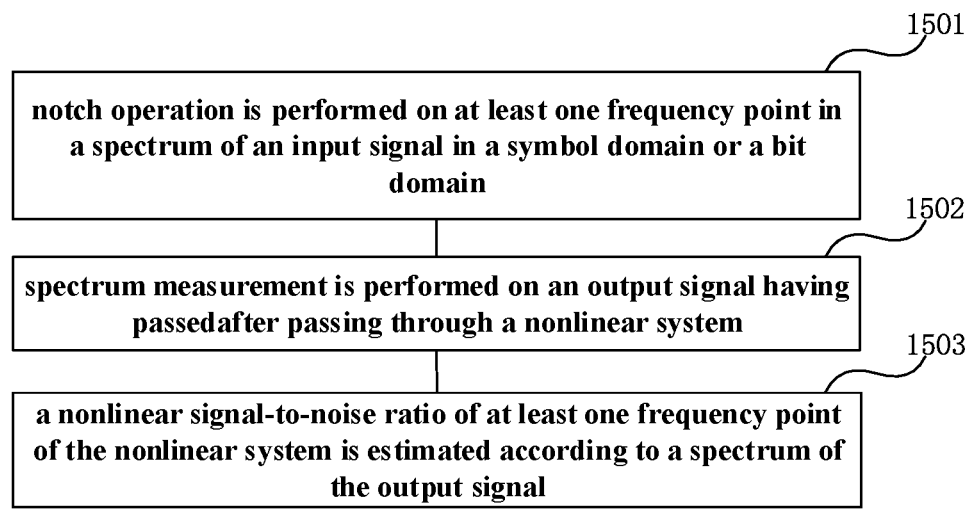
FIG. 15 is a schematic diagram of an implementation of a method for measuring a nonlinear signal-to-noise ratio according to an embodiment of the present disclosure.

FIG. 15 is a schematic diagram of an implementation of a method for measuring a nonlinear signal-to-noise ratio according to an embodiment of the present disclosure. As illustrated in FIG. 7, the method includes:

1501: notch operation is performed on at least one frequency point in a spectrum of an input signal in a symbol domain or a bit domain;

1502: spectrum measurement is performed on an output signal after passing through a nonlinear system; and

1503: a nonlinear signal-to-noise ratio of at least one frequency point of the nonlinear system is estimated according to a spectrum of the output signal.

In some embodiments, the method for measuring a nonlinear signal-to-noise ratio of the present disclosure is applied to a communication system with pulse shaping, and the input signal is a signal before upsampling, wherein, the input signal is a real signal or a complex signal, in a case where the input signal is a real signal, the method performs the notch operation on the real signal, in a case where the input signal is a complex signal, the method performs the notch operation on an I-branch signal and a Q-branch signal of the complex signal respectively, or the method directly performs the notch operation on the complex signal.

In some embodiments, the method for measuring a nonlinear signal-to-noise ratio is applied to a communication system without pulse shaping, and the input signal is a signal before digital-to-analog conversion.

In some embodiments, the method for measuring a nonlinear signal-to-noise ratio is applied to a communication system with probabilistic shaping, and the input signal is a signal without the probabilistic shaping or a signal after the probabilistic shaping.

In some embodiments, the method for measuring a nonlinear signal-to-noise ratio is applied to a communication system with forward error correction (FEC) coding, and the input signal is a signal without forward error correction or a signal after forward error correction.

In some embodiments, the method for measuring a nonlinear signal-to-noise ratio of the present disclosure is applied to a code division multiplexing system, and the input signal is a signal without spread spectrum modulation.

In some embodiments, the method for measuring a nonlinear signal-to-noise ratio of the present disclosure further includes performing notch operation by using one of:

a frequency-domain power reduction method;

a time-domain convolutional band-stop filter method: and an isospectral isoprobabilistic notch operation method.

In some embodiments, performing notch operation by using an probability-maintained notch operation method includes: making a signal after the notch operation and the input signal have identical frequency spectra and probability density functions (PDFs).

In some embodiments, performing notch operation by using an isospectral isoprobabilistic notch operation method further includes performing isoprobabilistic processing and isospectral processing cyclically on the input signal by taking a reference signal as a standard, until an obtained signal meets requirements on a target probability distribution and a target spectrum at the same time, so as to obtain a signal after the notch operation; wherein, a probability distribution of the reference signal meets the requirement on the target probability distribution; the isoprobabilistic processing refers to processing that makes a probability density distribution of the output signal identical to that of the reference signal; the isospectral processing refers to processing that makes a power distribution of the spectrum of the output signal close to a requirement on a power distribution of the target spectrum.

In some embodiments, performing notch operation by using an isospectral isoprobabilistic notch operation method further comprises: performing perturbation processing before the isospectral processing, the perturbation processing refers to processing that makes a structure of a spectrum of the input signal randomly changed within a resolution bandwidth.

In some embodiments, performing notch operation by using a frequency-domain power reduction method includes: performing fast Fourier transform (FFT) on the input signal to transform the input signal to frequency domain, multiplying the frequency-domain transformed signal by a band-stop filter, and performing inverse fast Fourier transform (IFFT) on the signal output from the band-stop filter to transform the output signal to time domain to obtain a signal after the notch operation.

In some embodiments, performing notch operation by using a time-domain convolutional band-stop filter method includes: passing the input signal through a convolution band-stop filter to obtain the signal after the notch operation.

With the method of this embodiment, by performing the notch operation on at least one frequency point in the spectrum of the input signal in the symbol domain or the bit domain, the internal structures of symbols of the input signal are retained, and the nonlinear noise in the communication system can be accurately estimated, so that the estimation of the nonlinear noise is not affected by the pulse shaping. In addition, the embodiments of the present disclosure can be applied to different modulation formats, transmission rates and input power, and are simple, easily operable, and conveniently realizable. Moreover, the embodiments of the present disclosure can effectively detect, analyze and locate the nonlinear noise, and accurately estimate the performance of the nonlinear system.

It should be noted that FIG. 15 only schematically illustrates the embodiments of the present disclosure, and the present disclosure is not limited thereto. For example, each step may be appropriately adjusted, and some other steps may be added or reduced. Those skilled in the art can make appropriate modifications according to the above content, without being limited to the illustration of FIG. 15.

Those described above are just examples of the embodiments of the present disclosure, and the present disclosure is not limited thereto. Appropriate modifications may be made based on the above embodiments. For example, the above embodiments may be adopted separately, or one or more of them may be combined.

With the method of this embodiment, when the notch operation is performed, the internal structures of symbols or bits of the input signal are retained, and the nonlinear noise in the communication system can be accurately estimated, so that the estimation of the nonlinear noise is not affected by the pulse shaping. In addition, the method can be applied to different modulation formats, transmission rates and input power, and it is simple, easily operable, and conveniently realizable. Moreover, the method can effectively detect, analyze and locate the nonlinear noise, and accurately estimate the performance of the nonlinear system.

Embodiments of a Third Aspect

The embodiments of the present disclosure provide a communication system.

Figure 16:
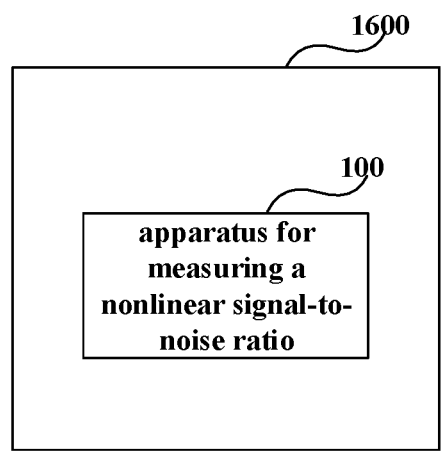
FIG. 16 is a schematic diagram of a communication system according to an embodiment of the present disclosure.

FIG. 16 is a schematic diagram of a communication system 1600 according to an embodiment of the present disclosure. As illustrated in FIG. 16, the communication system 1600 includes the apparatus 100 for measuring a nonlinear signal-to-noise ratio according to the embodiments of the first aspect.

In some embodiments, the communication system may further include other devices.

For example, a communication system with pulse shaping may further include a modulation module, an upsampling module, a pulse shaping module, a digital-to-analog conversion device, a nonlinear system device, etc.

For another example, a communication system without pulse shaping may further include a modulation module, a digital-to-analog conversion device, a nonlinear system device, etc.

For another example, a communication system with probabilistic shaping may further include a modulation module, a probabilistic shaping module, an upsampling module, a pulse shaping module, a digital-to-analog conversion device, a nonlinear system device, etc.

For another example, a communication system with FEC encoding may further include a modulation module, an FEC encoding module, an upsampling module, a pulse shaping module, a digital-to-analog conversion device, a nonlinear system device, etc.

For another example, a code division multiplexing (CDM) communication system may further include a spread spectrum module, a modulation module, a transmitter, a power amplifier, etc.

In some embodiments, the communication system may further include other devices, such as an optical receiver and an optical transmitter; the optical transmitter includes an apparatus 100 for measuring a nonlinear signal-to-noise ratio, and the optical receiver receives a signal transmitted by the optical transmitter.

In the embodiments of the first aspect, the apparatus for measuring a nonlinear signal-to-noise ratio and other systems have been described in detail, and the contents thereof are incorporated here, and will not be repeated.

With the method of this embodiment, when the notch operation is performed, the internal structures of symbols or bits of the input signal are retained, and the nonlinear noise in the communication system can be accurately estimated, so that the estimation of the nonlinear noise is not affected by the pulse shaping. In addition, the method can be applied to different modulation formats, transmission rates and input power, and it is simple, easily operable, and conveniently realizable. Moreover, the method can effectively detect, analyze and locate the nonlinear noise, and accurately estimate the performance of the nonlinear system.

Figure 17:
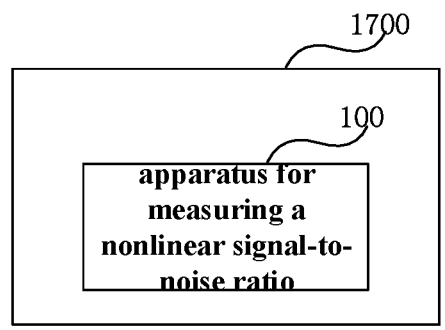
FIG. 17 is a schematic diagram of a test instrument according to an embodiment of the present disclosure.

The embodiments of the present disclosure further provide a test instrument. FIG. 17 is a schematic diagram of a test instrument 1700 according to an embodiment of the present disclosure. As illustrated in FIG. 17, the test instrument 1700 includes the apparatus 100 for measuring a nonlinear signal-to-noise ratio described in the embodiments of the first aspect. The specific implementations of the test instrument 1700 may refer to the embodiments of the first aspect. Since the apparatus 100 for measuring a nonlinear signal-to-noise ratio has been described in detail in the embodiments of the first aspect, the content thereof is incorporated here, and will not be repeated.

The embodiments of the present disclosure further provide a computer-readable program, wherein when being executed in an apparatus for measuring a nonlinear signal-to-noise ratio, the program causes the apparatus for measuring a nonlinear signal-to-noise ratio to perform the method according to the embodiments of the second aspect.

The embodiments of the present disclosure provide a storage medium in which a computer-readable program is stored, wherein the computer-readable program causes an apparatus for measuring a nonlinear signal-to-noise ratio to perform the method according to the embodiments of the second aspect.

The above devices and methods of the present disclosure may be implemented by hardware or a combination of hardware and software. The present disclosure relates to a computer-readable program which, when being executed by a logic unit, enables the logic unit to implement the above devices or constituent parts, or enables the logic unit to implement the above methods or steps. The present disclosure also relates to a storage media storing the above program, such as a hard disk, a magnetic disk, an optical disk, a DVD, a flash memory, etc.

The methods/devices described in conjunction with the embodiments of the present disclosure may be directly embodied as hardware, a software module executed by a processor, or a combination thereof. For example, one or more of the functional block diagrams illustrated in the drawings and/or one or more combinations of the functional block diagrams may correspond to either respective software modules or respective hardware modules of a computer program flow. The software modules may respectively correspond to the steps illustrated in the drawings. The hardware modules for example may be implemented by solidifying the software modules with a field programmable gate array (FPGA).

The software module may be located in an RAM memory, a flash memory, an ROM memory, an EPROM memory, an EEPROM memory, a register, a hard disk, a removable disk, a CD-ROM or any other form of storage medium known in the art. A storage medium may be coupled to a processor, so that the processor can read information from and write information to the storage medium. Or, the storage medium may be a constituent part of the processor. The processor and the storage medium may be in an ASIC. The software module may be stored in a memory of a mobile terminal, or in a memory card insertable into the mobile terminal. For example, if a device (such as a mobile terminal) adopts a large-capacity MEGA-SIM card or a large-capacity flash memory device, the software module may be stored in the large-capacity MEGA-SIM card or the large-capacity flash memory device.

One or more of the functional blocks described in the drawings and/or one or more combinations of the functional blocks may be implemented as a general-purpose processor, a digital signal processor (DSP), an application specific integrated circuit (ASIC), a field programmable gate array (FPGA) or any other programmable logic device, discrete gates or transistor logic devices, discrete hardware components or any suitable combination thereof, for performing the functions described in the present disclosure. One or more of the functional blocks described in the drawings and/or one or more combinations of the functional blocks may further be realized as a combination of computing devices, such as a combination of a DSP and a microprocessor, a plurality of microprocessors, one or more microprocessors in communication with the DSP, or any other such configuration.

The present disclosure has been described above in conjunction with the specific implementations, but those skilled in the art should understand that these descriptions are exemplary rather than limiting the protection scope of the present disclosure. Those skilled in the art can make various variations and modifications to the present disclosure according to the spirit and principle of the present disclosure, and these variations and modifications should also fall within the scope of the present disclosure.

Regarding the implementations including the above embodiments, the following example supplements are further disclosed:

in an example, a method for measuring a nonlinear signal-to-noise ratio, wherein the method may include performing notch operation on at least one frequency point in a spectrum of an input signal in a symbol domain or a bit domain; performing spectrum measurement on an output signal after passing through a nonlinear system; and estimating a nonlinear signal-to-noise ratio of at least one frequency point of the nonlinear system according to a spectrum of the output signal.

In an example, an object of the notch operation is an independent signal in time domain.

In an example, the method may be applied to a communication system with pulse shaping, and the input signal is a signal before upsampling.

In an example, the input signal is a real signal, and the notch operation is performed on the real signal.

In an example, the input signal is a complex signal, and the notch operation is performed on an I-branch signal and a Q-branch signal of the complex signal respectively.

In an example, the input signal is a complex signal, and the notch operation is directly performed on the complex signal.

In an example, the method may be applied to a communication system without pulse shaping, and the input signal is a signal before digital-to-analog conversion.

In an example, the method may be applied to a communication system with probabilistic shaping, and the input signal is a signal without the probabilistic shaping or a signal after the probabilistic shaping.

In an example, the method may be applied to a communication system with forward error correction (FEC) coding, and the input signal is a signal without forward error correction or a signal after forward error correction.

In an example, the method may be applied to a code division multiplexing communication system, and the input signal is a signal without spread spectrum modulation.

In an example, a measurement method of the nonlinear signal-to-noise ratio may be according to any one of the example methods described above, wherein the notch operation adopts one of:
a frequency-domain power reduction method;
a time-domain convolutional band-stop filter method; and
an isospectral isoprobabilistic notch method.

In an example, when the notch filtering is performed by using the isospectral isoprobabilistic notch operation method, a signal after the notch operation and the input signal have identical frequency spectra and probability density functions (PDFs).

In an example, the isospectral isoprobabilistic notch operation method includes: performing isoprobabilistic processing and isospectral processing cyclically on the input signal by taking a reference signal as a standard, until an obtained signal meets requirements on a target probability distribution and a target spectrum at the same time, so as to obtain a signal after the notch operation; wherein, a probability distribution of the reference signal meets the requirement on the target probability distribution; the isoprobabilistic processing refers to processing that makes a probability density distribution of the output signal identical to that of the reference signal; the isospectral processing refers to processing that makes a power distribution of the spectrum of the output signal close to a requirement on a power distribution of the target spectrum.

In an example, the isospectral isoprobabilistic notch operation method further includes performing perturbation processing before the isospectral processing, the perturbation processing refers to processing that makes a structure of a spectrum of the input signal randomly changed within a resolution bandwidth.

In an example, the frequency-domain power reduction method includes performing fast Fourier transform (FFT) on the input signal to transform the input signal to frequency domain, multiplying a frequency-domain transformed signal by a band-stop filter, and performing inverse fast Fourier transform (IFFT) on a signal output from the band-stop filter to transform the output signal to time domain to obtain the signal after the notch operation.

In an example, the time-domain convolutional band-stop filter method includes passing the input signal through a convolution band-stop filter to obtain the signal after the notch operation.

In an example, the nonlinear signal-to-noise ratio at a frequency fn of the notch operation is estimated according to signal power and nonlinear noise power in the spectrum of the output signal, wherein power at both sides of the frequency fn is signal power P, and power at the frequency fn is nonlinear noise power N.

In an example, the nonlinear signal-to-noise ratios corresponding to different frequencies are obtained by changing a position of the frequency fn of the notch operation.

In an example, a communication system may include an apparatus to measure a nonlinear signal-to-noise ratio according to the example methods described above for measuring a nonlinear signal-to-noise ratio.

The invention claimed is:

1. An apparatus comprising:
a memory; and
a processor coupled to the memory, the processor to control execution of a process including,
performing a notch operation on at least one frequency point in a spectrum of an input signal in a symbol domain or a bit domain;
performing a spectrum measurement on an output signal after passing through a nonlinear system; and
estimating a nonlinear signal-to-noise ratio of at least one frequency point of the nonlinear system according to the spectrum of the output signal.

2. The apparatus according to claim 1, wherein,
the apparatus is configured in a communication system with pulse shaping, and the input signal is a signal before upsampling,
wherein the input signal is a real signal or a complex signal,
in a case where the input signal is a real signal, the process includes performing the notch operation on the real signal, and
in a case where the input signal is a complex signal, the process includes performing the notch operation on an I-branch signal and a Q-branch signal of the complex signal respectively, or directly performs the notch operation on the complex signal.

3. The apparatus according to claim 1, wherein,
the apparatus is configured in a communication system without pulse shaping, and the input signal is a signal before digital-to-analog conversion.

4. The apparatus according to claim 1, wherein,
the apparatus is configured in a communication system with probabilistic shaping, and the input signal is a signal without the probabilistic shaping or a signal after the probabilistic shaping; or
the apparatus is configured in a communication system with forward error correction (FEC) coding, and the input signal is a signal without forward error correction or a signal after forward error correction; or
the apparatus is configured in a code division multiplexing (CDM) system, and the input signal is a signal without spread spectrum modulation.

5. The apparatus according to claim 1, wherein the process includes performing the notch operation by using one of:
a frequency-domain power reduction method;
a time-domain convolutional band-stop filter method; and
an isospectral isoprobabilistic notch operation method.

6. The apparatus according to claim 5, wherein,
when process includes performing the notch operation by using the isospectral isoprobabilistic notch operation method, a signal after the notch operation and the input signal have identical frequency spectra and probability density functions (PDFs).

7. The apparatus according to claim 6, wherein the process further includes:
performing isoprobabilistic processing and isospectral processing cyclically on the input signal by taking a reference signal as a standard, until an obtained signal meets a requirement on a target probability distribution and a target spectrum at same time, so as to obtain a signal after the notch operation;
wherein,
a probability distribution of the reference signal meets the requirement on the target probability distribution;
the isoprobabilistic processing refers to processing that makes a probability density distribution of the output signal identical to that of the reference signal;
the isospectral processing refers to processing that makes a power distribution of the spectrum of the output signal close to a requirement on a power distribution of the target spectrum.

8. The apparatus according to claim 7, wherein the process further includes performing perturbation processing before the isospectral processing, the perturbation processing refers to processing that makes a structure of a spectrum of the input signal randomly changed within a resolution bandwidth.

9. The apparatus according to claim 6, wherein,
when the notch operation is performed by using the frequency-domain power reduction method, the process is to:
perform fast Fourier transform (FFT) on the input signal to transform the input signal to frequency domain, multiply a frequency-domain transformed signal by a band-stop filter, and perform inverse fast Fourier transform (IFFT) on a signal output from the band-stop filter to transform the output signal to time domain to obtain the signal after the notch operation; and
when the notch operation is performed by using the time-domain convolution band-stop filter method, the process is to:
pass the input signal through a convolution band-stop filter to obtain the signal after the notch operation.

10. A test instrument, comprising the apparatus to measure a nonlinear signal-to-noise ratio according to claim 1.

11. The test instrument according to claim 10, wherein when in a communication system with pulse shaping, the input signal is a signal before upsampling,
wherein the input signal is a real signal or a complex signal,
in a case where the input signal is a real signal, the process includes performing the notch operation on the real signal, and
in a case where the input signal is a complex signal, the process includes performing the notch operation on an I-branch signal and a Q-branch signal of the complex signal respectively, or directly performs the notch operation on the complex signal.

12. The apparatus according to claim 1, wherein when in a communication system without pulse shaping, the input signal is a signal before digital-to-analog conversion.

13. The apparatus according to claim 1, wherein
when in a communication system with probabilistic shaping, the input signal is a signal without the probabilistic shaping or a signal after the probabilistic shaping; or
when in a communication system with forward error correction (FEC) coding, the input signal is a signal without forward error correction or a signal after forward error correction; or
when in a code division multiplexing (CDM) system, the input signal is a signal without spread spectrum modulation.

14. The apparatus according to claim 1, wherein the process includes performing the notch operation by using one of:
a frequency-domain power reduction method;
a time-domain convolutional band-stop filter method; and
an isospectral isoprobabilistic notch operation method.

15. The apparatus according to claim 14, wherein,
when process includes performing the notch operation by using the isospectral isoprobabilistic notch operation method, a signal after the notch operation and the input signal have identical frequency spectra and probability density functions (PDFs).

16. The apparatus according to claim 15, wherein the process further includes:
performing isoprobabilistic processing and isospectral processing cyclically on the input signal by taking a reference signal as a standard, until an obtained signal meets on a target probability distribution and a target spectrum at the same time, so as to obtain a signal after the notch operation;
wherein,
a probability distribution of the reference signal meets the requirement on the target probability distribution;
the isoprobabilistic processing refers to processing that makes a probability density distribution of the output signal identical to that of the reference signal;
the isospectral processing refers to processing that makes a power distribution of the spectrum of the output signal close to a requirement on a power distribution of the target spectrum.

17. The apparatus according to claim 15, wherein the process further includes performing perturbation processing before the isospectral processing, the perturbation processing refers to processing that makes a structure of a spectrum of the input signal randomly changed within a resolution bandwidth.

* * * * *